United States Patent
Snyder et al.

(10) Patent No.: US 11,301,855 B2
(45) Date of Patent: Apr. 12, 2022

(54) DATA VERIFICATION IN TRANSACTIONS IN DISTRIBUTED NETWORK

(71) Applicant: Visa International Service Association, San Francisco, CA (US)

(72) Inventors: Randall A. Snyder, Las Vegas, NV (US); Thomas S. Ginter, Bellevue, WA (US); Michael F. Buhrmann, North Bend, WA (US)

(73) Assignee: Visa International Service Association, San Francisco, CA (US)

( * ) Notice: Subject to any disclaimer, the term of this patent is extended or adjusted under 35 U.S.C. 154(b) by 919 days.

(21) Appl. No.: 15/713,148

(22) Filed: Sep. 22, 2017

(65) Prior Publication Data

US 2018/0075437 A1 Mar. 15, 2018

Related U.S. Application Data

(63) Continuation of application No. 13/382,900, filed as application No. PCT/US2010/041264 on Jul. 7, 2010, now abandoned.

(60) Provisional application No. 61/223,671, filed on Jul. 7, 2009, provisional application No. 61/223,677, filed on Jul. 7, 2009.

(51) Int. Cl.
*G06Q 20/32* (2012.01)
*G06Q 20/40* (2012.01)
*G06Q 20/42* (2012.01)

(52) U.S. Cl.
CPC ......... *G06Q 20/4016* (2013.01); *G06Q 20/32* (2013.01); *G06Q 20/3223* (2013.01); *G06Q 20/3224* (2013.01); *G06Q 20/40* (2013.01); *G06Q 20/4014* (2013.01); *G06Q 20/425* (2013.01)

(58) Field of Classification Search
CPC .................................................. G06Q 20/3223
See application file for complete search history.

(56) References Cited

U.S. PATENT DOCUMENTS

| | | | |
|---|---|---|---|
| 5,892,900 A * | 4/1999 | Ginter | G06F 21/10 726/26 |
| 6,612,488 B2 | 9/2003 | Suzuki | |
| 6,658,568 B1 * | 12/2003 | Ginter | G06F 21/10 348/E5.006 |
| 6,832,721 B2 | 12/2004 | Fujii | |
| 6,868,391 B1 | 3/2005 | Hultgren | |

(Continued)

OTHER PUBLICATIONS

Paul F. Roberts. "RSA Puts Forth Token Effort; Service Employs Cyota's Risk-Based Authentication." eWeek 23.10 (2006): 27—. Print. (Year: 2006).*

(Continued)

*Primary Examiner* — Jacob C. Coppola
*Assistant Examiner* — Eduardo Castilho
(74) *Attorney, Agent, or Firm* — Kilpatrick Townsend & Stockton LLP

(57) ABSTRACT

Systems and methods for verifying a financial transaction based on an account number, a mobile directory number associated with the financial transaction, a mobile directory number associated with the account number, an email address associated with the account number, internet protocol address data associated with the financial transaction, and internet protocol address data associated with accesses of the email address.

14 Claims, 9 Drawing Sheets

(56) References Cited

U.S. PATENT DOCUMENTS

| | | | |
|---|---|---|---|
| 6,913,194 B2 | 7/2005 | Suzuki | |
| 6,948,656 B2 | 9/2005 | Williams | |
| 7,104,444 B2 | 9/2006 | Suzuki | |
| 7,152,788 B2 | 12/2006 | Williams | |
| 7,376,431 B2 | 5/2008 | Niedermeyer | |
| 7,403,922 B1* | 7/2008 | Lewis | G06Q 10/0635 |
| | | | 705/38 |
| 7,500,607 B2 | 3/2009 | Williams | |
| 7,503,489 B2 | 3/2009 | Heffez et al. | |
| 7,594,605 B2 | 9/2009 | Aaron et al. | |
| 7,669,759 B1 | 3/2010 | Zettner | |
| 7,684,809 B2 | 3/2010 | Niedermeyer | |
| 7,697,942 B2 | 4/2010 | Stevens | |
| 7,743,981 B2 | 6/2010 | Willaims | |
| 7,747,535 B2 | 6/2010 | Mikan et al. | |
| 7,752,135 B2 | 7/2010 | Brown et al. | |
| 8,116,731 B2 | 2/2012 | Buhrrmann et al. | |
| 8,135,624 B1 | 3/2012 | Ramalingam et al. | |
| 8,140,403 B2 | 3/2012 | Ramalingam et al. | |
| 8,166,068 B2 | 4/2012 | Stevens | |
| 8,255,284 B1 | 8/2012 | Ramalingam et al. | |
| 8,280,348 B2 | 10/2012 | Snyder et al. | |
| 8,285,639 B2 | 10/2012 | Eden et al. | |
| 8,315,947 B2 | 11/2012 | Aaron et al. | |
| 8,341,029 B1 | 12/2012 | Ramalingam et al. | |
| 8,374,634 B2 | 2/2013 | Dankar et al. | |
| 8,401,906 B2 | 3/2013 | Ruckart | |
| 8,548,858 B2* | 10/2013 | May | G06Q 20/40 |
| | | | 705/18 |
| 8,588,748 B2 | 11/2013 | Buhrrman et al. | |
| 8,615,465 B2 | 12/2013 | Boutcher et al. | |
| 8,632,002 B2 | 1/2014 | Boutcher et al. | |
| 2001/0046862 A1* | 11/2001 | Coppinger | G06F 8/65 |
| | | | 455/435.1 |
| 2002/0194119 A1* | 12/2002 | Wright | G06Q 30/0609 |
| | | | 705/38 |
| 2003/0097561 A1 | 5/2003 | Wheeler et al. | |
| 2003/0135463 A1* | 7/2003 | Brown | G06Q 20/04 |
| | | | 705/44 |
| 2005/0039036 A1* | 2/2005 | Eisen | G06F 16/20 |
| | | | 713/193 |
| 2005/0097320 A1* | 5/2005 | Golan | G06F 21/40 |
| | | | 713/166 |
| 2005/0228996 A1 | 10/2005 | Mayer | |
| 2006/0131390 A1 | 6/2006 | Kim | |
| 2006/0161435 A1* | 7/2006 | Atef | G06Q 20/401 |
| | | | 704/246 |
| 2006/0180660 A1* | 8/2006 | Gray | H04W 12/0608 |
| | | | 235/380 |
| 2007/0178883 A1* | 8/2007 | Nandagopal | G06Q 20/322 |
| | | | 455/411 |
| 2007/0250441 A1 | 10/2007 | Paulsen et al. | |
| 2008/0040275 A1* | 2/2008 | Paulsen | G06Q 20/40 |
| | | | 705/44 |
| 2008/0162338 A1* | 7/2008 | Samuels | G06Q 20/108 |
| | | | 705/38 |
| 2008/0164308 A1 | 7/2008 | Aaron et al. | |
| 2008/0208760 A1* | 8/2008 | Keithley | G06Q 20/04 |
| | | | 705/75 |
| 2008/0222002 A1* | 9/2008 | Hu | G06Q 40/025 |
| | | | 705/38 |
| 2008/0227471 A1* | 9/2008 | Dankar | G06Q 20/3224 |
| | | | 455/456.6 |
| 2008/0249951 A1 | 10/2008 | Gilder et al. | |
| 2009/0132423 A1* | 5/2009 | Liu | G06Q 20/108 |
| | | | 705/70 |
| 2009/0210308 A1* | 8/2009 | Toomer | G06Q 20/32 |
| | | | 705/16 |
| 2009/0260064 A1* | 10/2009 | McDowell | G06F 21/10 |
| | | | 726/4 |
| 2009/0307778 A1* | 12/2009 | Mardikar | G06Q 20/3278 |
| | | | 726/26 |
| 2010/0094791 A1* | 4/2010 | Miltonberger | G06Q 20/40 |
| | | | 706/46 |
| 2010/0146609 A1* | 6/2010 | Bartlett | G06Q 20/02 |
| | | | 726/7 |
| 2010/0293090 A1* | 11/2010 | Domenikos | G06Q 10/04 |
| | | | 705/38 |
| 2010/0293094 A1* | 11/2010 | Kolkowitz | G06Q 20/4014 |
| | | | 705/44 |
| 2010/0325035 A1* | 12/2010 | Hilgers | G06Q 10/10 |
| | | | 705/38 |
| 2012/0047072 A1* | 2/2012 | Larkin | G06Q 20/3223 |
| | | | 705/44 |
| 2012/0130898 A1 | 5/2012 | Snyder et al. | |
| 2013/0041821 A1* | 2/2013 | Kingston | G06Q 40/02 |
| | | | 705/44 |

OTHER PUBLICATIONS

Bill Goodwin. "HBOS to Extend Security System to Debit Cards after Major Reduction in Online Fraud." Computer Weekly (2006): 24—. Print. (Year: 2006).*

P. Venkataram, B. S. Babu, M. K. Naveen and G. H. Samyama Gungal, "A Method of Fraud & Intrusion Detection for E-payment Systems in Mobile e-Commerce," 2007 IEEE International Performance, Computing, and Communications Conference, 2007, pp. 395-401, doi: 10.1109/PCCC.2007.358919. (Year: 2007).*

Examination Report, dated Dec. 1, 2017, in EP Application No. 10797816.5, 7 pages.

International Search Report and Written Opinion, dated Aug. 31, 2010, in PCT Application No. PCT/US10/41264, 10 pages.

U.S. Appl. No. 13/382,900, Final Office Action, dated Oct. 23, 2015, 18 pages.

U.S. Appl. No. 13/382,900, Final Office Action, dated May 25, 2017, 25 pages.

U.S. Appl. No. 13/382,900, Non-Final Office Action, dated Oct. 20, 2016, 19 pages.

Application No. EP10797816.5, Extended European Search Report, dated Jun. 6, 2016, 8 pages.

* cited by examiner

| Account (Card) Number | Wireless Device ID (MDN) | Location Data | Historical Location Data | | Carrier Supplemental Data | Email Address | Historical IP Address Data | | Identity Risk Value |
|---|---|---|---|---|---|---|---|---|---|
| 1234-5678-1234-5678 | +1-702-555-0000 | LAC, Age of LAC | Date-Time Date-Time Date-Time Date-Time Date-Time ... | Location Location Location Location Location ... | Pre-Paid, Carrier X | j.doe@att.net | Date-Time Date-Time Date-Time Date-Time Date-Time ... | IP Address IP Address IP Address IP Address IP Address ... | 123 |
| 1111-2222-3333-4444 | +1-702-555-1234 | MSCID, MCC, MNC, NDC | Date-Time Date-Time Date-Time Date-Time Date-Time ... | Location Location Location Location Location ... | Porting History, Subscriber Name | kyle@gmail.com | Date-Time Date-Time Date-Time Date-Time Date-Time ... | IP Address IP Address IP Address IP Address IP Address ... | 456 |
| 8765-4321-8765-4321 | +1-209-555-1111 | Subscriber State, CID | Date-Time Date-Time Date-Time Date-Time Date-Time ... | Location Location Location Location Location ... | Age of Subscription, Post-Paid, Carrier Y | thomas@work.org | Date-Time Date-Time Date-Time Date-Time Date-Time ... | IP Address IP Address IP Address IP Address IP Address ... | 9999 |
| 2222-3333-4444-5555 | +1-425-555-0000 | MSCID, Subscriber State | Date-Time Date-Time Date-Time Date-Time Date-Time ... | Location Location Location Location Location ... | Age of Subscription, Pre-Paid, Carrier Z | emily@work.gov | Date-Time Date-Time Date-Time Date-Time Date-Time ... | IP Address IP Address IP Address IP Address IP Address ... | 333 |
| ... | ... | ... | ... | ... | ... | ... | ... | ... | ... |

EXEMPLARY IDENTITY DATABASE

*FIG. 2*

EXEMPLARY WIRELESS NETWORK DATA LOGIC RESOURCES

| Location Data | | Supplemental Data | | Logic Resource |
|---|---|---|---|---|
| Location | Weighting Factor | Data Type | Weighting Factor | |
| MSCID | Value 1 | Pre-Paid | Value 1 | Wireless Network Data Logic Resource X |
| CID | Value 2 | Post-Paid | Value 2 | |
| CC | Value 3 | Subscription Age | Value 3 | |
| NDC | Value 4 | Porting History | Value 4 | |
| LAC | Value 5 | Subscriber Name | Value 5 | |
| GPS | Value 6 | Status | Value 6 | |
| other | Value n | other | Value n | |
| Location | Weighting Factor | Data Type | Weighting Factor | |
| MSCID | Value 1 | Pre-Paid | Value 1 | Wireless Network Data Logic Resource Y |
| CID | Value 2 | Post-Paid | Value 2 | |
| CC | Value 3 | Subscription Age | Value 3 | |
| NDC | Value 4 | Porting History | Value 4 | |
| LAC | Value 5 | Subscriber Name | Value 5 | |
| GPS | Value 6 | Status | Value 6 | |
| other | Value n | other | Value n | |
| Location | Weighting Factor | Data Type | Weighting Factor | |
| MSCID | Value 1 | Pre-Paid | Value 1 | Wireless Network Data Logic Resource Z |
| CID | Value 2 | Post-Paid | Value 2 | |
| CC | Value 3 | Subscription Age | Value 3 | |
| NDC | Value 4 | Porting History | Value 4 | |
| LAC | Value 5 | Subscriber Name | Value 5 | |
| GPS | Value 6 | Status | Value 6 | |
| other | Value n | other | Value n | |

*FIG. 3*

| Email Data | | Logic Resource |
|---|---|---|
| IP Address | Weighting Factor | |
| xx.xx.xx.xx | Value 1 | Email Data Logic Resource X |
| yy.yy.yy.yy | Value 2 | |
| zz.zz.zz.zz | Value 3 | |
| ... | ... | |
| nn.nn.nn.nn | Value n | |
| IP Address | Weighting Factor | |
| xx.xx.xx.xx | Value 1 | Email Data Logic Resource Y |
| yy.yy.yy.yy | Value 2 | |
| zz.zz.zz.zz | Value 3 | |
| ... | ... | |
| nn.nn.nn.nn | Value n | |
| IP Address | Weighting Factor | |
| xx.xx.xx.xx | Value 1 | Email Data Logic Resource Z |
| yy.yy.yy.yy | Value 2 | |
| zz.zz.zz.zz | Value 3 | |
| ... | ... | |
| nn.nn.nn.nn | Value n | |

FIG. 4 EXEMPLARY EMAIL DATA LOGIC RESOURCES

DATA VERIFICATION IN TRANSACTIONS IN DISTRIBUTED NETWORK

CROSS REFERENCE TO RELATED APPLICATIONS

This patent application claims the benefit of U.S. Provisional Patent Application Ser. No. 61/223,671 filed Jul. 7, 2009, and entitled, "Mobile Directory Number Verification of Financial Transactions" and U.S. Provisional Patent Application Ser. No. 61/223,677 filed Jul. 7, 2009, and entitled, "Email Verification of Financial Transactions," both of which are hereby incorporated by reference in their entirety.

BACKGROUND OF THE INVENTION

Card-not-present (CNP) and card-present (CP) financial fraud is an increasing problem that plagues the financial industry. For CNP transactions, the customer's card is not physically available for a merchant to inspect. The merchant must rely on the cardholder (or someone purporting to be the cardholder) to present the information on the card by some indirect means, whether by mail, telephone or over the Internet when the cardholder is not present at the point of sale. Although more and more CNP fraud solutions continue to be introduced such as Address Verification Service (AVS), Visa® Advanced Authorization (VAA), and MasterCard SecureCode®, online fraud continues to grow at a rapid pace. For CP transactions, the customer's card is available for a merchant to inspect, but various means of counterfeiting cards have emerged. Multiple CP fraud solutions continue to be introduced, such as predictive analytics solutions, decisioning solutions and rules-based solutions. However, CP fraud also continues to grow.

Card-based financial fraud may occur, for example, when a payment instrument is stolen. Payment instruments include credit card account numbers, debit card account numbers and the like. Using stolen account numbers, purchases may be made or new fraudulent accounts may be established using additional personal data, whether that personal data is legitimate or not. Furthermore, fraudulent merchant accounts may be established based on collusion of fraudulent buyers and sellers using stolen payment instruments. Moreover, financial fraud using stolen payment instruments may occur for a variety of circumstances, including, but not limited to, first-time orders on a merchant website where a new account profile is registered, first-time orders on a merchant website where account profiles are not required to be registered and subsequent orders on a merchant website with an existing account profile where the existing account profile has been previously used.

Among the primary characteristics of financial fraud solutions is the means to both properly identify, and verify that means of identification, for a person engaging in a financial transaction. Among the unique identifiers for a person engaging in a financial transaction are the person's mobile directory number (MDN) and the person's email address. The use of mobile phones and email have proliferated over the past two decades. More and more people are associating these identifiers with their financial account profiles for a variety of reasons. Many people use mobile phones exclusively or as their primary means of communication with others and electronic commerce (e-commerce) has become a primary means for purchasing retail products over the Internet.

A telephone directory number is the actual dialable phone number used to call a person on a telephone. An MDN is the dialable phone number used to call a person on a mobile phone. Email addresses are typically required to be provided to an online merchant when making a retail purchase over the Internet. In many cases, these unique means of communicating with individuals are also associated with personal information associated with a financial account, such as a debit card or credit card account with a bank or financial institution. Many financial institutions require telephone numbers, email addresses or both to be associated with a person's account so they can be contacted by the institution for a variety of purposes, such as marketing of bank products, alerting for changes in account status, when financial fraud is suspected or other reasons.

Telephone directory numbers and MDNs can be up to 15 digits long and are unique numbers worldwide. These numbers are associated with both a unique individual as well as a telecommunications network carrier that services particular numbers. Similarly, email addresses are also associated with both a unique individual and an email service provider. Because of this uniqueness, telephone numbers (both mobile and wireline) as well as email addresses can be considered an extension of the unique identity of a person in many cases.

Furthermore, the 15-digit directory number format for all directory numbers worldwide (both mobile and wireline) is internationally standardized by the International Telecommunications Union (ITU) in *ITU-T Recommendation E.164—The International Public Telecommunication Numbering Plan*. The format of this standardized number is comprised of a 1- to 3-digit country code (CC) and a national significant number. The national significant number is comprised of a national destination code (NDC) and a subscriber number (SN). As the country code and the national destination code are geographically based, access to these numbers may provide geographic information that may be pertinent to the identity and whereabouts of a person associated with the numbers.

Moreover, the email address format for all email addresses worldwide is internationally standardized by the Internet Engineering Task Force in *Request For Comment (RFC) 5321 Simple Mail Transfer Protocol and RFC 5322 Internet Message Format*. The format of this standardized email address is "local-part@domain." The value of the "local-part" portion of the address typically indicates the name of an individual that is the email user, but can take on a variety characters. The value of the "domain" portion of the address typically indicates the name of an organization associated with the email user, but can also take on a variety characters. As the "local-part" and "domain" are typically name-based, the character strings that make up the entire email address may provide information that is pertinent to the identity of a person associated with the address.

Card associations and payment networks, such as Visa®, MasterCard®, American Express®, Discover® and others, rely on a combination of fraud detection tools to combat financial fraud. For example, an analysis of Internet data and order parameters as well as address verification, customer behavior analysis, screening mechanisms, rules based algorithms, etc. may lead to the conclusion that a particular online order is suspect.

SUMMARY OF THE INVENTION

An object of an embodiment of the present invention is to provide a system, and its methods of use, to detect fraudulent transactions based on information derived from a payment network pertaining to payment transactions, information derived from a wireless network pertaining to particular wireless device IDs (e.g. mobile directory numbers) and information derived from a financial institution pertaining to cardholders associated with financial accounts. The invention relates generally to protecting the identity of a cardholder and detecting identity theft by using the wireless device ID of the cardholder's wireless device (e.g. mobile phone) and validating that wireless device ID using data obtained from a payment network and a financial institution pertaining to the cardholder. This data may be used to validate the wireless device ID obtained from the payment network where such validation may be used for a variety of applications, such as assisting in the detection and prevention of identity theft, fraudulent behavior or activity that may be engaged in by a purported cardholder.

Another object of an embodiment of the present invention is to provide a system, and its methods of use, to detect fraudulent transactions based on information derived from a payment network pertaining to payment transactions, information derived from a wireless network pertaining to particular wireless device IDs (e.g. MDNs) and information derived from a financial institution pertaining to cardholders associated with financial accounts. Data pertaining to the wireless device ID obtained from a wireless network 102 and data pertaining to the cardholder obtained from a financial institution can be used as the basis for a statistical analysis, resulting in an identity risk value. Data that may be obtained and derived include the wireless device ID (e.g. the MDN) itself, other telephone numbers (directory numbers) associated with the account, location data of the wireless device identified by the wireless device ID, supplementary subscription data associated with the wireless device, the format and characteristics of the wireless device ID and the format and characteristics of other directory numbers. All location data obtained or otherwise derived from telephone directory numbers provides utility for fraud detection as irregular or anomalous locations associated with an individual may be indicative of financial fraud. Furthermore, supplementary subscription data associated with the wireless device, such as the network serving the wireless device, age of the subscription, name on the subscription, porting history of the directory number, and subscribed supplementary features (e.g. call forwarding), may be indicative of financial fraud. This data may be used for a variety of applications, such as assisting in the detection and prevention of identity theft, fraudulent behavior or activity that may be engaged in by a purported cardholder.

Yet another object of an embodiment of the present invention is to provide a system, and its methods of use, to detect fraudulent transactions based on information derived from a payment network pertaining to payment transactions, information derived from a financial institution pertaining to cardholders associated with financial accounts and information derived from an email service provider pertaining to particular email addresses and Internet Protocol (IP) data pertaining to cardholders associated with email accounts. This data may be used to validate the email address data obtained from the payment network where such validation may be used for a variety of applications, such as assisting in the detection and prevention of identity theft, fraudulent behavior or activity that may be engaged in by a purported cardholder.

Yet another object of an embodiment of the present invention is to provide a system, and its methods of use, to detect fraudulent transactions based on information derived from a payment network pertaining to payment transactions, information derived from a financial institution pertaining to cardholders associated with financial accounts and information derived from an email service provider pertaining to particular email addresses and Internet Protocol (IP) data pertaining to cardholders associated with email accounts. Data pertaining to the email addresses obtained from a financial institution and data pertaining to the cardholder obtained from an email service provider can be used as the basis for a statistical analysis, resulting in an identity risk value. Data that may be obtained and derived include the email address, IP address data associated with the email address and the format and characteristics of the email address itself. All location data obtained or otherwise derived from IP address data provides utility for fraud detection as irregular or anomalous locations associated with an individual may be indicative of financial fraud as IP address data may be indicative of location data where an email account has been accessed by an individual. This data may be used for a variety of applications, such as assisting in the detection and prevention of identity theft, fraudulent behavior or activity that may be engaged in by a purported cardholder.

Yet another object of an embodiment of the present invention is to provide a system, and its method of use, for detecting identity theft based on analysis of a multiplicity of provided and stored parameters associated with derived locations, historical locations, supplementary subscription data about a wireless device ID (e.g. MDN) associated with a wireless device, historical use of a particular wireless device ID, derived data about an email address, historical use of an email address, IP address data and historical patterns of locations and use of MDNs and email addresses.

A further exemplary embodiment of the present invention applies to and has utility for detecting and preventing identity theft. Identity theft occurs, for example, when an individual's identity credentials are compromised, or otherwise stolen, by perpetrators of fraud. These perpetrators use the identity credentials of individual victims to obtain some financial or other benefit at a cost to the victim.

By recognizing patterns when analyzing at least one of the locations and/or data associated with cardholders' wireless devices, telephone directory numbers, email addresses, IP addresses where email accounts are used and supplementary subscription data associated with a wireless or mobile phone subscription, statistical models can be derived and used to determine a probability that a purported wireless device or email user is engaged in either some usual and regular behavior or potentially irregular or anomalous behavior. Irregular or anomalous behavior may be an indication that identity theft has occurred and probabilistic techniques and models to determine incidents of identity theft may be created to detect, with some degree of accuracy, that identity theft has in fact occurred.

These and other examples of the invention will be described in further detail below.

BRIEF DESCRIPTION OF THE DRAWINGS

Preferred and alternative examples of the present invention are described in detail below with reference to the following drawings:

FIG. 2 depicts an exemplary Identity Database used to associate unique financial account (card) numbers, wireless device IDs (e.g. MDNs) and email addresses with wireless network derived location data, wireless network derived supplemental data (e.g. subscription data), email service provider data and identity risk values.

FIG. 3 depicts exemplary Wireless Network Data Logic Resources including wireless device location data, wireless network supplemental data (e.g. subscription data) and one or more logic resources.

FIG. 4 depicts exemplary Email Data Logic Resources including IP address data and one or more logic resources.

DETAILED DESCRIPTION OF THE PREFERRED EMBODIMENT

Figure 1:
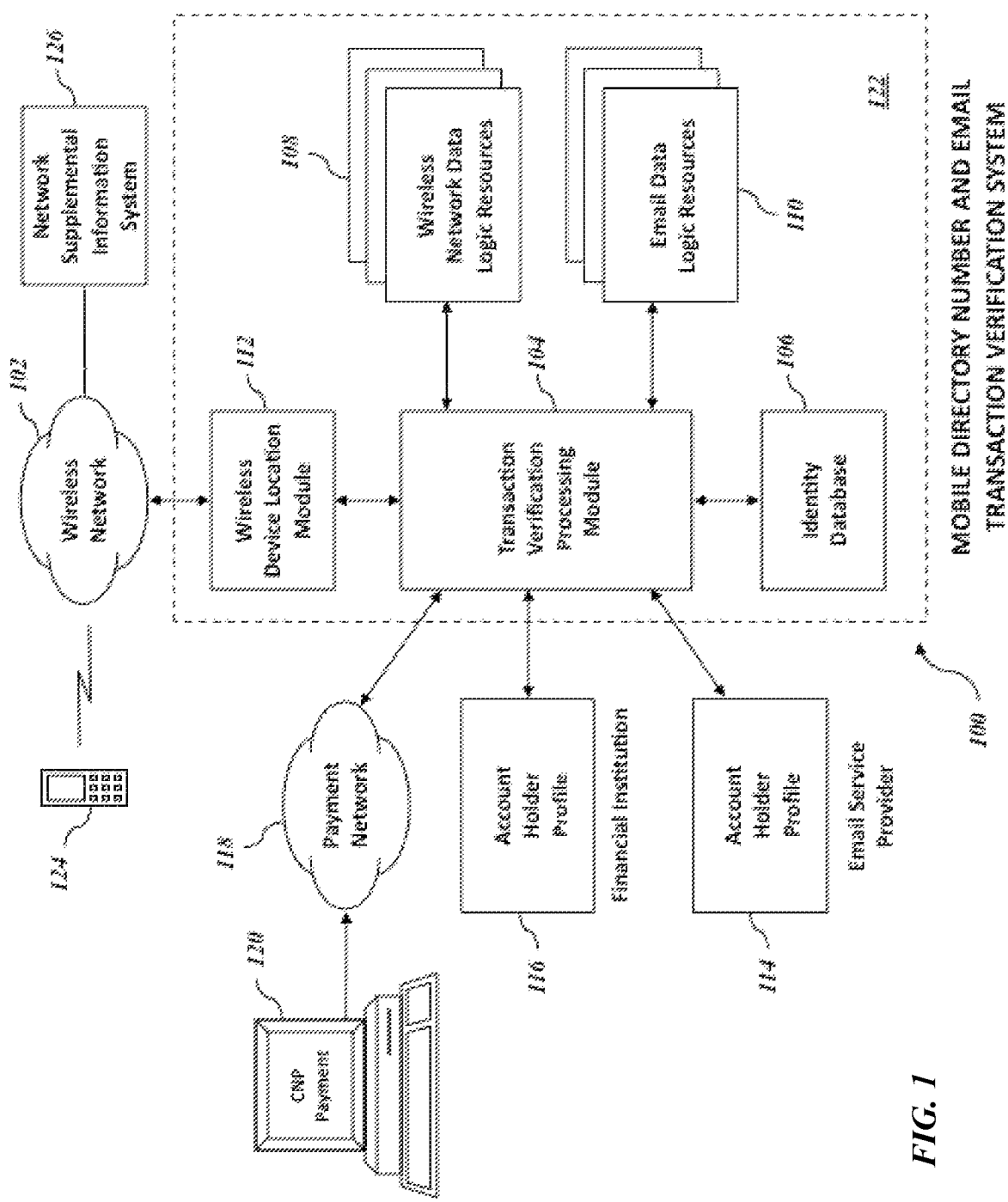
FIG. 1 depicts the functional entities and modules of an exemplary Mobile Directory Number and Email Transaction Verification System formed in accordance with an embodiment of the present invention. Included in the example is a Transaction Verification Processing Module, a Wireless Device Location Module, an Identity Database, one or more Wireless Network Data Logic Resources and one or more Email Data Logic Resources in accordance with the principles of the present invention.

FIG. 1 depicts the functional entities and modules of an exemplary Mobile Directory Number and Email Transaction Verification System 100. FIG. 1 shows a block diagram of a system for Mobile Directory Number and Email Transaction Verification. (The System 100 may also be referred to as a Mobile Directory Number and Email Transaction Verification System.) Embodiments of the Mobile Directory Number and Email Transaction Verification System 100, based upon information received from a payment network 118, a wireless network 102, an account holder profile at a financial institution 116 and an account holder profile at an email service provider 114, and optionally other information, assess the likelihood that a financial transaction is fraudulent.

Examples of financial transactions that may cause information to be received from a payment network 118 include the purchase of a product or service using a credit card or the like, where the product or service is purchased by an account holder at a particular location (point of purchase) or at a remote location (such as a "mail order" purchase, "telephone order" purchase or purchase from an Internet website). Point of purchase transactions may include, for example, use of a debit card or credit card to obtain cash from an automatic teller machine (ATM) or use of a debit card or credit card to purchase products or services at a point of sale employing an electronic point of sale terminal. It is appreciated that embodiments of the Mobile Directory Number and Email Transaction Verification System 100 may be configured to provide an assessment of the likelihood of fraud for any type of financial transaction.

Included in the example is an exemplary Mobile Directory Number and Email Transaction Verification System 100 used to verify financial transactions based on a mobile directory number (MDN) received from one of a payment network 118, an account holder profile from a financial institution 116 or both. Similarly, the Mobile Directory Number and Email Transaction Verification System 100 may be used to verify financial transactions based on an email address, IP address data or both received from one of a payment network 118, an account holder profile from a financial institution 116 or both. The example depicts a Transaction Verification Processing Module 104, a Wireless Device Location Module 112, an Identity Database 106, one or more Wireless Network Data Logic Resources 108 and one or more Email Data Logic Resources 110 in accordance with the principles of the present invention.

The Wireless Device Location Module 112 supports communications used to receive, or request and receive, location data and supplementary wireless network data, such as wireless device subscription data associated with a particular wireless device, from the wireless network 102.

The Transaction Verification Processing Module 104 obtains financial transaction data from a payment network 118 that may be associated with a financial transaction made by an account holder. The Transaction Verification Processing Module 104 also obtains account number data and optionally one or more of mobile directory number (MDN) data, email address data and IP address data associated with the account holder making the financial transaction. The account number data, MDN data, email address data and IP address data may have been previously provided to the payment network 118 in a variety of ways. The account number data, MDN data and email address data may be provided directly by an account holder, for example, into an Internet website form displayed on a computing device 120 while making a purchase for a product or service. This same data may also be provided indirectly by an online merchant during the purchase process that may, for example, be stored by the online merchant as part of the account holder's registered account profile. Additionally, IP address data may be provided, for example, directly by an online merchant which may be obtained from a computer such as the computing device 120 associated with an online Internet session with the online merchant.

The Transaction Verification Processing Module 104 receives the account number data, optional MDN data, optional email address data and optional IP address data pertaining to a financial transaction and passes this data to the Identity Database 106. This data pertaining to the account holder making the financial transaction may or may not have been previously stored in the Identity database 106. The Identity Database 106 stores the received data for use in the financial transaction verification process. The Transaction Verification Processing Module 104 sends the received account number data pertaining to a financial transaction to the financial institution 116, along with a request for additional account profile data associated with the account holder. The financial institution 116 maintains an account profile for the account number associated with the account holder making the financial transaction. The additional account profile data requested from the financial institution 116 may include one or more of the previously stored account holder's MDN, other phone numbers associated with the account (such as additional mobile, home or business phone numbers) and one or more email addresses. The financial institution 116 responds to this request for data by sending one or more of the previously stored account holder's MDN, other phone numbers associated with the account and one or more email addresses. When the Transaction Verification Processing Module 104 receives this additional account profile data, it passes the data to the Identity Database 106 for storage and use for the financial transaction verification process.

A first embodiment of the Mobile Directory Number and Email Transaction Verification System 100 may be based upon a query-response communication mechanism between the Mobile Directory Number and Email Transaction Verification System 100 and the payment network 118 that requests validation of the MDN supplied and associated with a financial transaction. If an MDN associated with a financial transaction is obtained via the payment network 118 and an MDN associated with the financial account corresponding to the financial transaction is obtained via the account holder profile from the financial institution 116, the obtained MDNs may be analyzed and compared. This analysis and comparison may be performed by the Transaction Verification Processing Module 104 itself or another module within the Mobile Directory Number and Email Verification System 100 without deviating from the principles of the present invention. The financial transaction may be verified if the result of the analysis and comparison reveals that the received MDNs are identical. If the obtained MDNs are not identical, an indication that the financial transaction was performed by an individual other than the actual account holder may be deduced. At this point, an indication that the financial transaction is either verified or not verified may be passed to the payment network 118, which may or may not result in the financial transaction being either authorized or declined.

Furthermore, the Mobile Directory Number and Email Transaction Verification System 100 may be based upon a query-response communication mechanism between the Mobile Directory Number and Email Transaction Verification System 100 and the payment network 118 that requests validation of the email address supplied and associated with a financial transaction. If an email address associated with the financial transaction is obtained via the payment network 118 and an email address associated with the financial account corresponding to the financial transaction is obtained via the account holder profile from the financial institution 116, the obtained email addresses may be analyzed and compared. This analysis and comparison may be performed by the Transaction Verification Processing Module 104 itself or another module within the Mobile Directory Number and Email Verification System 100 without deviating from the principles of the present invention. The financial transaction may be verified if the result of the analysis and comparison reveals that received email addresses are identical. If the obtained email addresses are not identical, an indication that the financial transaction was performed by an individual other than the actual account holder may be deduced. At this point, an indication that the financial transaction is either verified or not verified may be passed to the payment network 118, which may or may not result in the financial transaction being either authorized or declined.

The first embodiment generally does not require location data, or other wireless network supplementary subscription data for the provided MDN. Furthermore, the first embodiment generally does not require IP address-based location data for the provided email address. This embodiment functions without the need for wireless network connectivity for location queries or supplementary wireless network subscription data queries associated with the MDN and without the need for email service provider connectivity for historical IP address data. If the MDN, email address or both is deemed valid and a match with the respective MDN, email address or both associated with the financial transaction, then no further action may need to be taken.

An alternate embodiment includes the addition of wireless network location data and/or wireless network supplementary subscription data obtained from a wireless network 102, other telephone directory number data associated with the MDN of the account holder obtained from the financial institution 116 and IP address data obtained from the email service provider 114 as part of the Mobile Directory Number and Email Transaction Verification System 100. This alternate embodiment includes connectivity to the wireless network 102 serving the wireless device 124 associated with the MDN and/or connectivity to the email service provider 114 associated with the email address. This alternate embodiment has the benefit of adding value to the Mobile Directory Number and Email Transaction Verification System 100 for the verification and analysis of an MDN and/or email address associated with a financial transaction provided in the first embodiment.

In an alternate embodiment, once data has been received by the payment network 118 pertaining to a particular financial transaction and also received by the financial institution account holder profile as described in the first embodiment of the Mobile Directory Number and Email Transaction Verification System 100, a request may be made to the wireless network 102 for location data and supplementary subscription data for the provided MDN. This request may be made, for example, by the Transaction Verification Processing Module 104 via the Wireless Device Location Module 112 using the MDN obtained, for example, from the payment network 118 or the account holder profile from the financial institution 116. The Transaction Verification Processing Module 104 passes the wireless device ID (e.g. the MDN) associated with the financial transaction to the Wireless Device Location Module 112 that is used to obtain the location of a wireless device such as the wireless device 124, for example, and optionally supplementary data associated with a wireless device subscription, from the wireless network 102. The Wireless Device Location Module 112 requests wireless device location data and/or wireless network supplementary subscription data from the wireless network 102. The wireless network 102 may obtain this data, for example, from a network supplemental information system 126. The wireless network 102 responds to the request from the Wireless Device Location Module 112 for wireless device location data and/or wireless network supplementary subscription data. Wireless device location data provided from the wireless network 102 may include current or last known location data pertaining to the wireless device 124.

Moreover, once data has been received by the payment network 118 pertaining to a particular financial transaction and also received by the financial institution account holder profile as described in the first embodiment of the Mobile Directory Number and Email Transaction Verification System 100, a request may be made to the email service provider 114 for historical IP address data for the provided email address. This request may be made, for example, by the Transaction Verification Processing Module 104 using the email address obtained, for example, from the payment network 118 or the account holder profile at the financial institution 116. The Transaction Verification Processing Module 104 passes the email address associated with the financial transaction to the email service provider 114 to request historical IP address data from the email service provider 114. The email service provider 114 may obtain this data, for example, from the account holder profile associated with the email address. The email service provider 114 responds to the request from the Transaction Verification Processing Module 104 with IP address data associated with the provided email address. IP address data provided from the email service provider may include previous IP addresses from which the email account associated with the provided email address was accessed and the date and time associated with the IP address from which the email account was accessed.

Non-limiting examples of wireless device location data that may be available and obtained from the wireless network 102 pertaining to the MDN obtained from the payment network 118 or obtained from the account holder profile at the financial institution 116 include:

Location area. A location area is the area associated with a mobile switching center (MSC) serving cell sites subtending the MSC which service wireless devices identified, for example, by an MDN. A location area may be represented by a location area code (LAC) and an MSC may be represented by an MSCID.

Cell identity (e.g. CID, in longitude and latitude or other location context) of the cell site serving wireless devices identified, for example, by an MDN.

Global Positioning System (GPS) coordinates (e.g. in longitude and latitude or other location context) for wireless devices identified, for example, by an MDN.

Wireless network base station identifier associated with a wireless network access point (e.g. in longitude and latitude or other location context) serving wireless devices. A wireless network access point may be, for example, a WiFi access point, WiMAX access point or any other access point that may provide service to a wireless device.

Date and time the provided wireless device location data was recorded by the wireless network 102.

Those of ordinary skill in the art will understand and appreciate these example types of wireless device location data that may be obtained from a wireless network 102 and the formats for which this data is provided.

Non-limiting examples of one or more of the following wireless network supplementary subscription data may be available and obtained from the wireless network 102 or from other telecommunications networks. The supplementary subscription data may pertain to other obtained directory numbers associated with the account holder that were obtained via the account holder profile at the financial institution 116, to the MDN obtained from the payment network 118, or to the MDN obtained from the account holder profile at the financial institution 116. These non-limiting examples include:

Directory number assigned and in use. For any obtained mobile or wireline directory number, it may be determined whether that directory number is assigned to, and being used by, a subscriber.

Directory number a mobile number or a wireline number. For any obtained directory number, it may be determined whether that directory number is assigned to a wireless network subscriber or a wireline network subscriber.

Network serving the directory number. For any obtained directory number, it may be determined which network provides service to that number.

If the directory number is an MDN, current status of the wireless device 124. For MDNs, it may be determined whether the wireless device is currently turned on and being served by a wireless network or not.

If the directory number is an MDN, it may be determined whether the wireless device 124 is in the home service area or roaming into another service area or a visited network.

If the directory number is an MDN and the wireless device is roaming, it may be determined which visited network is serving the wireless device 124.

If the directory number is an MDN and the wireless device is roaming, it may be determined which country the visited network serving the wireless device 124 is in.

Name on the directory number associated with the network subscription. For any obtained directory number, the subscriber's name associated with the subscription may be determined.

Age of the directory number subscription. For any obtained directory number, the length of time the current subscriber has been associated with the subscription may be determined.

Porting history of the directory number. For any obtained directory number, the porting history of the number may be obtained. The porting history may provide the networks that have served the directory number in the past and whether these networks were wireless networks or wireline networks.

Pre-paid payment status of the subscription. For any obtained directory number, the pre-paid payment status of the number may be obtained.

Post-paid payment status of the subscription. For any obtained directory number, the post-paid payment status of the number may be obtained.

Supplementary subscription features associated with the directory number associated with the wireless device 124. For any obtained directory number, subscribed features associated with the network subscription may be obtained, such as call forwarding.

Those of ordinary skill in the art will understand and appreciate these example types of wireless supplementary subscription data that may be obtained from a wireless network 102 or other telecommunications networks, and the methods and formats for which this data is provided.

Non-limiting examples of one or more of the following geographic location data that may be derived from the format of the obtained MDN, or other obtained directory numbers associated with the account holder and obtained via the account holder profile at the financial institution 116, are:

Country code (CC) of the directory number. For any obtained directory number, the CC representing the country where the directory number is assigned may be determined.

National destination code (NDC). For any obtained directory number, the NDC representing a geographical area within a country where the directory number is assigned may be determined.

The derivation of geographic location data from the CC and/or NDC of one or more obtained directory numbers may occur, for example, at the Transaction Verification Processing Module 104 itself or another module within the Mobile Directory Number and Email Verification System 100 without deviating from the principles of the present invention.

Those of ordinary skill in the art will understand and appreciate these example types of data that may be derived about the format of a directory number and the methods for which this data is derived.

Non-limiting examples of one or more of the following IP address data may be available and obtained from an email service provider pertaining to the email address obtained from the payment network 118 or obtained from the account holder profile at the financial institution 116 are:

IP address. IP addresses are typically geographically based and of the form XX.XX.XX.XX.

Date and time that access to the email account associated with the provided IP address was recorded by the email service provider 114.

The derivation of geographic location data from the IP address may occur, for example, at the Transaction Verification Processing Module 104 itself or another module within the Mobile Directory Number and Email Verification System 100 without deviating from the principles of the present invention. Those of ordinary skill in the art will understand and appreciate these example types of data that may be derived about the format of an IP address and the methods for which this data is derived.

Non-limiting examples of one or more of the following identity information data that may be derived from the format of an obtained email address associated with an account holder and pertaining to the email address obtained from the payment network 118 or obtained from an account holder profile at the financial institution 116 are:

Local-part of the email address. For any obtained email address, the local-part representing the user name of the email account may be determined.

Domain of the email address. For any obtained email address, the domain representing the organization name of the email account may be determined.

The derivation of identity data from the local-part and/or domain of one or more obtained email addresses may occur, for example, at the Transaction Verification Processing Module 104 itself or another module within the Mobile Directory Number and Email Verification System 100 without deviating from the principles of the present invention. Those of ordinary skill in the art will understand and appreciate these example types of data that may be derived about the format of an email address and the methods for which this data is derived.

When the wireless device location data, wireless network supplementary subscription data and other directory numbers associated with the account holder are obtained, the Wireless Device Location Module 112 passes the wireless device location data and wireless network supplementary subscription data associated with the MDN to the Identity Database 106 directly or indirectly via the Transaction Verification Processing Module 104 for storage and use for the financial transaction verification process. The geographic location data derived from the format of the obtained directory numbers (e.g. CC and NDC), are also passed to the Identity Database 106 for storage and use for the financial transaction verification process.

Similarly, when the appropriate IP address data are received from the email service provider 114 pertaining to the email address associated with a financial transaction and the account holder, the Transaction Verification Processing Module 104 passes the obtained IP address data and email address data associated with the email address to the Identity Database 106, directly or indirectly, for storage and use for the financial transaction verification process.

The Transaction Verification Processing Module 104 and the Identity Database 106 provide the appropriate data and parameters associated with the MDN to the Wireless Network Data Logic Resources 108 to determine an Identity Risk Value 216 associated with a financial transaction and an individual associated with the financial transaction and represented by the MDN. Similarly, the Transaction Verification Processing Module 104 and the Identity Database 106 provide the appropriate data and parameters associated with the email address to the Email Data Logic Resources 110 to determine an Identity Risk Value 216 associated with a financial transaction and an individual associated with the financial transaction and represented by the email address. The Identity Risk Value 216 may be determined using data and parameters in a manner as described with respect to FIGS. 3 and 4, for example.

The data may be provided directly to one or more Wireless Network Data Logic Resources 108 and/or one or more Email Data Logic Resources 110 by the appropriate modules or databases, or via the Transaction Verification Processing Module 104. One or more Wireless Network Data Logic Resources 108 and/or one or more Email Data Logic Resources 110 are used to calculate, generate or otherwise determine an Identity Risk Value 216 pertaining to the financial transaction. If both Wireless Network Data Logic Resources 108 and Email Data Logic Resources are used independently to calculate, generate or otherwise determine an Identity Risk Value 216 pertaining to the financial transaction, the resulting multiple identity risk values may be, for example, statistically merged, averaged or otherwise combined into a single identity risk value. Alternatively, if both Wireless Network Data Logic Resources 108 and Email Data Logic Resources are used independently to calculate, generate or otherwise determine an Identity Risk Value 216 pertaining to the financial transaction, the resulting multiple identity risk values may be preserved as independent results. The calculations may include statistical and probabilistic algorithms to generate or otherwise determine identity risk values, thereby indicating the level of risk of a financial transaction and whether it is likely or not that the financial transaction may be fraudulent. Once the identity risk values are calculated, generated or otherwise determined, they are passed to the Identity Database 106 directly or indirectly via the Transaction Verification Processing Module 104 for storage and use for the financial transaction verification process. The Transaction Verification Processing Module 104 may then pass the identity risk values associated with a particular financial transaction to the payment network 118 as part of the query-response communication between the Mobile Directory Number and Email Transaction Verification System 100 and the payment network 118. The identity risk values pertaining to the financial transaction that are passed to the payment network 118 may or may not result in the financial transaction being either authorized or declined.

The stored identity risk values associated with a wireless device ID (e.g. MDN) and/or an email address may subsequently be accessed and used in additional statistical and probabilistic algorithms or calculations for utility, for example, in determining irregular or fraudulent behavior associated with other transactions.

The alternate embodiment of the present invention may be used in conjunction with the first embodiment of the present invention as a further analysis to attempt to verify the financial transaction, or the alternate embodiment of the present invention may be used regardless of whether the first embodiment of the present invention is employed.

It should be understood that the Mobile Directory Number and Email Transaction Verification System 100 shown in FIG. 1 can be implemented using a computer system 122 having at least one processor, at least one memory component in signal communication with the processor, and at least one communications interface in signal communication with the processor. The Identity Database 106, the Wireless Network Data Logic Resources 108 and the Email Data Logic Resources 110 can be stored in the memory, for example. Programming instructions can also be stored in memory that when run by the processor cause the processor to be configured to implement the functions of the Transaction Verification Processing Module 104 and the Wireless Device Location Module 112. In some embodiments, the Transaction Verification Processing Module 104 and the Wireless Device Location Module 112 can be implemented with different processors. The communications interface can allow the processor to communicate with the wireless network 102 when running the processes of the Wireless Device Location Module 112. The communications interface can also allow the processor to receive data from the payment network 118, the financial institution 116 and the email service provider 114 as well as to send identity risk value results to other systems. The results can be sent to systems that triggered a financial transaction or to other systems. In some embodiments, more than one communications interface can be used. It should also be understood that the Mobile Directory Number and Email Transaction Verification System 100 can be implemented in a distributed manner using a plurality of computer systems such as the computer system 122 shown in FIG. 9, for example.

Generally, the Mobile Directory Number and Email Transaction Verification System 100 is used in a process of verifying an electronic financial transaction where one or more locations of the wireless device 124 and supplementary wireless network subscription data that are obtained or derived from a wireless network 102, one or more locations derived from other telephone directory numbers that are obtained from an account holder profile at the financial institution 116 and IP address data that are obtained from an account holder profile at the email service provider 114 are incorporated into the Wireless Network Data Logic Resources 108 and Email Data Logic Resources 110 to generate an identity risk value, to assist in creating a statistical model that can determine a likelihood that a financial transaction is fraudulent. The Mobile Directory Number and Email Transaction Verification System 100 can be used with any type of electronic financial transaction. Two non-limiting example types of financial transactions of interest are card-not-present (CNP) and card present (CP) financial transactions.

The financial transaction can be triggered by various types of financial applications. For example, a consumer desiring to make a purchase, withdraw money, transfer money between accounts, etc. can initiate an electronic financial transaction by using a computer network such as the Internet. For CNP financial transactions, the consumer can enter payment information such as a credit card or debit card account number, the consumer's MDN, the consumer's email address, the consumer's name and the consumer's address using an input device in signal communication with a computer used by the consumer. The payment information can then be transmitted to a computerized payment network 118 associated with a bank. For CP financial transactions, the consumer can use a payment instrument, such as a credit card or debit card, containing an account number at an electronic point-of-sale terminal associated with a retail merchant. The payment information can then be transmitted to a computerized payment network 118 associated with a bank. The payment network 118 can generate a financial transaction by sending financial transaction data that includes the consumer's MDN to the Mobile Directory Number and Email Transaction Verification System 100. The Mobile Directory Number and Email Transaction Verification System 100 receives the financial transaction data through the communications interface. A processor configured to implement the functions of the Transaction Verification Processing Module 104 and the Wireless Device Location Module 112 requests information pertaining to a device associated with the consumer's MDN from the wireless network 102. This information may include a location of the device, for example. The processor generates identity risk values based on at least one of the Wireless Network Data Logic Resources 108, Email Data Logic Resources 110 and Identity Database 106. The processor then sends a response based on the identity risk value back to the payment network 118. Based upon the received information provided by the Mobile Directory Number and Email Transaction Verification System 100, the payment network 118, a payment processing system associated with the payment network 118 or the retail merchant generates an acceptance decision based on the response and, in some cases, other predetermined criteria. If the acceptance decision is positive, the payment network 118, a payment processing system associated with the payment network 118 or the retail merchant allows the transaction to proceed and the consumer is notified that the financial transaction was successful, such as by displaying a confirmation number on a display device in signal communication with the computer used by the consumer. If the acceptance decision is negative, the payment network 118, a payment processing system associated with the payment network 118 or the retail merchant may not allow the financial transaction to proceed and notifies the consumer in a similar manner.

Embodiments of the Mobile Directory Number and Email Transaction Verification System 100 may be used to assess the likelihood of fraud of a financial transaction before the financial transaction is in progress, while the financial transaction is in progress and/or make an assessment after the financial transaction has concluded. For example, pre-authorization may be used to verify the identity of the purchaser prior to delivery of a goods or service to the purchaser. If the financial transaction pertains to a point of purchase transaction, a prior transaction approval process could be completed before the purchaser leaves the premises. As another non-limiting example, if the financial transaction pertains to an Internet purchase transaction, the transaction approval process could be completed before the purchased goods are mailed to the purchaser.

In the various embodiments of the Mobile Directory Number and Email Transaction Verification System 100, the likelihood of fraud of a particular financial transaction is assessed in response to receiving a request from a transaction entity that is conducting, or is associated with, the financial transaction. Non-limiting examples of transaction entities include payment networks, banks, credit card companies, Internet service providers and sellers of goods and/or services.

FIG. 2 depicts exemplary entries in the exemplary Identity Database 106 (FIG. 1). In particular a first entry includes an association among an Account Number 202, a Wireless Device ID 204 (e.g. in this case an MDN), wireless network derived Location Data 206, wireless network derived Historical Location Data 208 including a historical location and the date and time the historical location was derived, wireless network derived Carrier Supplemental Data 210 (e.g. in this case supplementary subscription data), an Email Address 212, email address Historical IP Address Data 214 including a historical IP address and the date and time the historical IP address was used to access an email account associated with the email address 212 and an Identity Risk Value 216. The Account Number 202 is received from the payment network 118 shown in FIG. 1 when a request is made to the Mobile Directory Number and Email Transaction Verification System 100 to verify a transaction. The Wireless Device ID 204 is used by the Wireless Device Location Module 106 in FIG. 1 to either request the Location Data 206 from the wireless network 102 or autonomously receive the Location Data 206 from the wireless network 102. The obtained Location Data 206 is then associated with some location context or geographic place, additional obtained Carrier Supplemental Data 210 as well as the Historical Location Date and Time 208 in the database. The entries for Carrier Supplemental Data 210 may be pre-populated or otherwise derived or obtained from the wireless network 102 or supporting communications data networks. The Email Address 212 is used by the Transaction Verification Processing Module 104 shown in FIG. 1 to either request the IP Address Data 214 from the email service provider 114 or autonomously receive the IP Address Data 214 from the email service provider 114. The obtained IP Address Data 214 is then associated with some location context or geographic place as well as the IP Address Date and Time 214 in the database.

The Historical Location Date and Time 208 contains entries representing the date and time of a particular obtained wireless device location to assist in determining, for example, an Identity Risk Value 216. The IP Address Data Date and Time 214 contains entries representing the date and time the email account associated with the email address 212 was accessed to assist in determining, for example, the Identity Risk Value 216.

The Identity Risk Value 216 for the associated Account Number 202 is generated due to some previous financial transaction or process and may take on a null or default value if a value has not previously been calculated. The Identity Risk Value 216 may be used in one or more Wireless Network Data Logic Resources 108 (FIG. 1), one or more Email Data Logic Resources 110 (FIG. 1) or both to generate subsequent Identity Risk Values that may be stored in the exemplary Identity Database 106.

FIG. 3 depicts exemplary entries for one or more exemplary Wireless Network Data Logic Resources 108 shown in FIG. 1. The entries include Wireless Network Data Logic Resources Location Data 302 and Wireless Network Data Logic Resources Supplemental Data 304. The location data 302 and/or the supplemental data 304 are used to provide information and data to Logic Resources 306 that indicate particular data parameters and factors for the data parameters used by the Wireless Network Data Logic Resources 108 shown in FIG. 1. In particular, as depicted in FIG. 3, a first entry includes Location Data 302, Supplemental Data 304 and the particular Logic Resource 306 associated with the calculation or generation of Identity Risk Values 216 in FIG. 2. The Location Data 302 is comprised of particular Locations 308 and Weighting Factors 310 for those Locations 308 associated with a particular Logic Resource 306. The Locations 308 (e.g. MSCID, CID, CC, NDC, LAC, GPS or some other derived location type) are locations associated with a Wireless Device ID (e.g. MDN) 204 as shown in FIG. 2 corresponding to a financial transaction and obtained via the payment network 118 or other telephone directory numbers associated with a financial institution account holder profile 116 in FIG. 1, associated with some financial transaction requiring an Identity Risk Value 216 in FIG. 2 for utility, such as for detecting identity theft and financial fraud. The Weighting Factors 310 are used to provide a relative value of the importance of a particular Location 308 used for a particular Logic Resource 306. The values of these Weighting Factors 310 may be changed automatically based upon the distance and time variances among any of the location and time parameters used. This enables the Wireless Network Data Logic Resources 108 shown in FIG. 1 to provide identity risk values indicating a likelihood of identity theft or financial fraud for a particular financial transaction associated with an Account Number 202 associated with a Wireless Device ID (e.g. MDN) 204 as shown in FIG. 2. The Supplemental Data 304 is comprised of particular Data Types 312 and Weighting Factors 314 for those Data Types 312 associated with a particular Logic Resource 306. The Data Types 312 (e.g. subscription age, subscription pre-paid, subscription post-paid, porting history, subscriber name, status or some other data type) are supplementary subscription data associated with a Wireless Device ID (e.g. MDN) 204 in or other telephone directory numbers associated with a financial institution account holder profile 116, associated with some financial transaction requiring an Identity Risk Value 216 for utility, such as for detecting identity theft and financial fraud. The Weighting Factors 314 are used to provide a relative value of the importance of a particular Data Type 312 used for a particular Logic Resource 306. The values of these Weighting Factors 312 may be changed automatically based upon variances among any of the Carrier Supplemental Data 210 used. This enables the Wireless Network Data Logic Resources 108 shown in FIG. 1 to provide identity risk values indicating a likelihood of identity theft or financial fraud for a particular financial transaction associated with an Account Number 202 associated with a Wireless Device ID (e.g. MDN) 204 as shown in FIG. 2.

FIG. 4 depicts exemplary entries for one or more exemplary Email Data Logic Resources data 110 shown in FIG. 1. Exemplary Email Data Logic Resources (Email Data) 402 are used to provide information and data to Logic Resources 404 that indicate particular data parameters and factors for the data parameters used by the Email Data Logic Resources 110 shown in FIG. 1. In particular, as depicted in FIG. 4, a first entry includes Email Data 402 and the particular Logic Resource 404 associated with the calculation or generation of Identity Risk Values 216 shown in FIG. 2. The Email Data 402 is comprised of particular IP Addresses 406 and Weighting Factors 408 for those IP Addresses 406 associated with a particular Logic Resource 404. The IP Addresses 406 (e.g. of the standard format XX.XX.XX.XX) are IP addresses associated with an Email Address 212 associated with a financial transaction and obtained via the payment network 118 or account holder profile at the financial institution 116, associated with some financial transaction requiring an Identity Risk Value 216 in FIG. 2 for utility, such as for detecting identity theft and financial fraud. The Weighting Factors 408 are used to provide a relative value of the importance of a particular IP Address 406 used for a particular Logic Resource 404. The values of these Weighting Factors 408 may be changed automatically based upon the distance and time variances among any of the derived IP address locations and time parameters used enabling the Email Data Logic Resources 110 in FIG. 1 to provide accurate identity risk values indicating a likelihood of identity theft or financial fraud for a particular financial transaction associated with an Account Number 202 in FIG. 2 associated with an Email Address 212 in FIG. 2.

Figure 5:
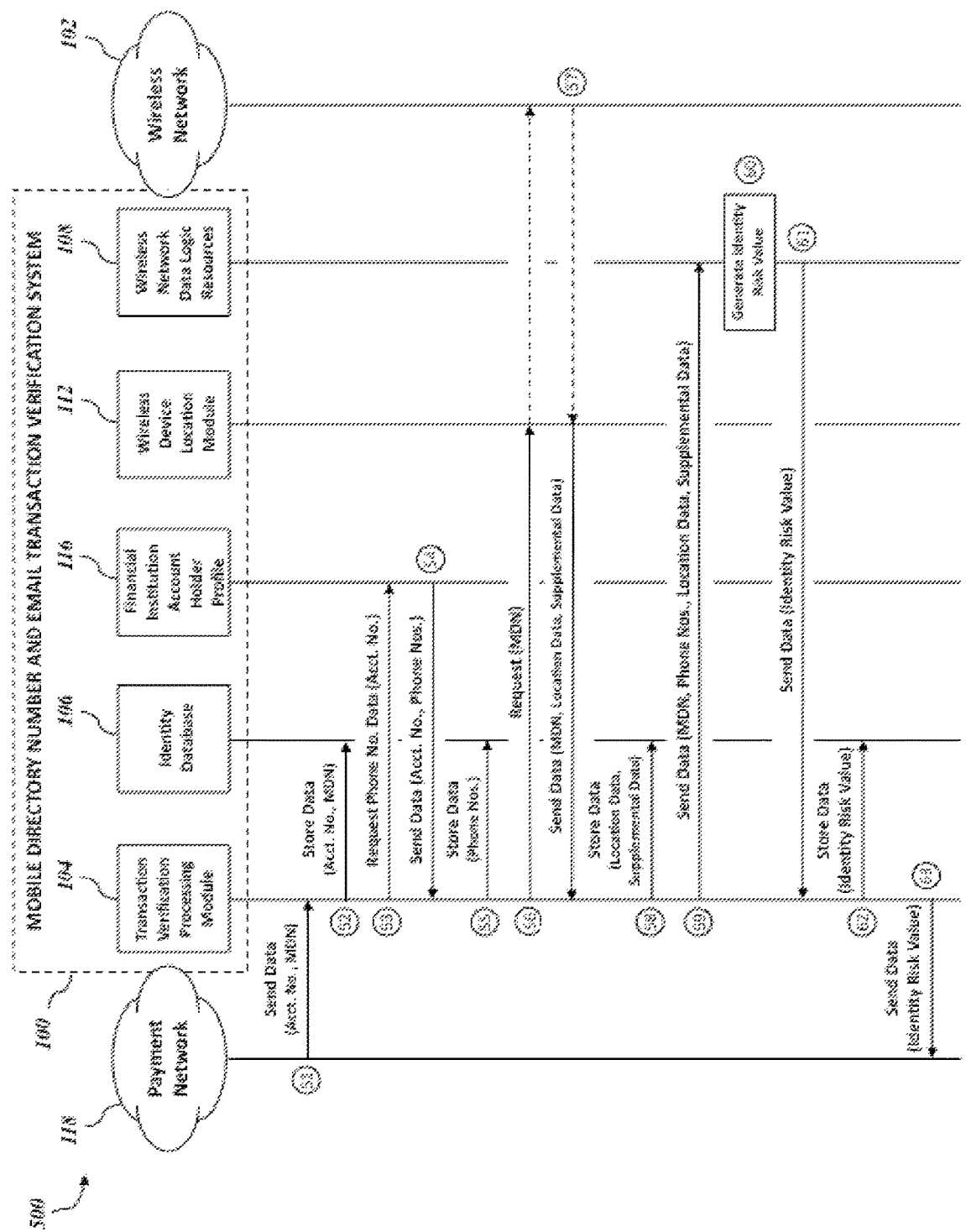
FIG. 5 depicts an exemplary flow diagram of the Mobile Directory Number and Email Transaction Verification System using Wireless Network Data Logic Resources.

FIG. 5 depicts an exemplary and detailed information and system flow diagram 500 representing the operation of the Mobile Directory Number and Email Transaction Verification System 100, in accordance with one embodiment of the present invention. In this exemplary information and system flow, an individual may initially invoke manually or automatically some financial transaction associated with some purchase of goods or services, or other financial operation using a payment instrument associated with a financial account number resulting in financial transaction information being sent to a payment network 118 and being obtained by the Mobile Directory Number and Email Transaction Verification System 100.

At a step 51, a financial transaction occurs and associated data is sent from the payment network 118 to the Transaction Verification and Processing Module 104 of the Mobile Directory Number and Email Transaction Verification System 100. An account number and optionally a Wireless Device ID (e.g. MDN) may be sent autonomously or requested based on some other interaction between the Mobile Directory Number and Email Transaction Verification System 100 and the payment network 118 or other payment processing system.

At a step 52, the Transaction Verification and Processing Module 104 passes the account number and optionally the Wireless Device ID 204 received from the payment network 118 to the Identity Database 106 for storage and subsequent use by an appropriate Wireless Network Data Logic Resource 108 associated with a particular financial transaction requiring an Identity Risk Value.

At a step 53, the Transaction Verification and Processing Module 104 makes a request to the financial institution 116 to obtain account holder data from the account holder profile. The requested data includes the MDN and optionally other telephone directory number data associated with the account holder corresponding to the provided account number in an example embodiment.

At a step 54, the financial institution 116 passes a Wireless Device ID (e.g. MDN) and optionally other telephone directory number data to the Transaction Verification and Processing Module 104.

At a step 55, the Transaction Verification and Processing Module 104 passes the Wireless Device ID (e.g. MDN) received from the financial institution 116 and, if provided by the financial institution 116, other telephone directory number data associated with the account holder to the Identity Database 106 for storage and subsequent use by the appropriate Wireless Network Data Logic Resource 108 associated with the particular financial transaction requiring an Identity Risk Value.

At a step 56, the Transaction Verification and Processing Module 104 passes the Wireless Device ID 204 (e.g. MDN) received from the financial institution 116 or received from the payment network 118 to the Wireless Device Location Module 112 so the Wireless Device Location Module 112 can request Location Data 206 from the wireless network 102 pertaining to the Wireless Device ID 204 (e.g. MDN). Optionally and additionally, the Wireless Device Location Module 112 may request Carrier Supplemental Data 210 (i.e. supplementary subscription data) associated with the provided Wireless Device ID 204 (e.g. MDN) from the wireless network 102. If additional mobile telephone directory numbers (e.g. MDNs) were previously received from the financial institution account holder profile 116 in step 54, the Wireless Device Location Module 112 may make additional requests to the wireless network 102 to provide Location Data 206 for those additional MDNs and optionally additional supplementary subscription data associated with those additional MDNs.

At a step 57, the wireless network 102 responds to the request for Location Data 206 pertaining to the Wireless Device ID 204 (e.g. MDN) previously provided. The wireless network 102 sends Location Data 206 pertaining to the Wireless Device ID 204 (e.g. MDN) to the Wireless Device Location Module 112. If the optional Carrier Supplemental Data 210 was previously requested by the Wireless Device Location Module 112, the wireless network 102 may send the requested Carrier Supplemental Data 210 to the Wireless Device Location Module 112. The Wireless Device Location Module 112 passes the Location Data 206 and Carrier Supplemental Data 210, if provided, for the corresponding requested Wireless Device ID 204 (e.g. MDN) either directly to the Identity Database 106 or indirectly via the Transaction Verification Processing Module 104.

At a step 58, if the Location Data 206 and Carrier Supplemental Data 210 associated with the Wireless Device ID (e.g. MDN) 204 is passed to the Transaction Verification Processing Module 104, it is then passed to the Identity Database 106 for storage and subsequent use by the appropriate Wireless Network Data Logic Resource 108 associated with a particular financial transaction requiring an Identity Risk Value.

At a step 59, the appropriate data and parameters stored within the Identity Database 106 and required by the Wireless Network Data Logic Resources 108 are passed either directly to the Wireless Network Data Logic Resources 108 or indirectly to the Wireless Network Data Logic Resources 108 via the Transaction Verification Processing Module 104 to be used in a calculation to generate an Identity Risk Value for the particular financial transaction requiring an Identity Risk Value.

At a step 60, an Identity Risk Value is generated based on the received and appropriate data and parameters.

At a step 61, the Identity Risk Value is passed either directly to the Identity Database 106 or indirectly to the Identity Database 106 via the Transaction Verification Processing Module 104.

At a step 62, if the Identity Risk Value is passed directly to the Transaction Verification Processing Module 104, the Transaction Verification Processing Module 104 passes the Identity Risk Value to the Identity Database 106 for storage and to be used for additional financial transactions requiring that Identity Risk Value.

At a step 63, the Transaction Verification Processing Module 104 passes the Identity Risk Value to the payment network 118 or other payment processing system for the corresponding financial transaction for which an Identity Risk Value was originally requested.

Figure 6:
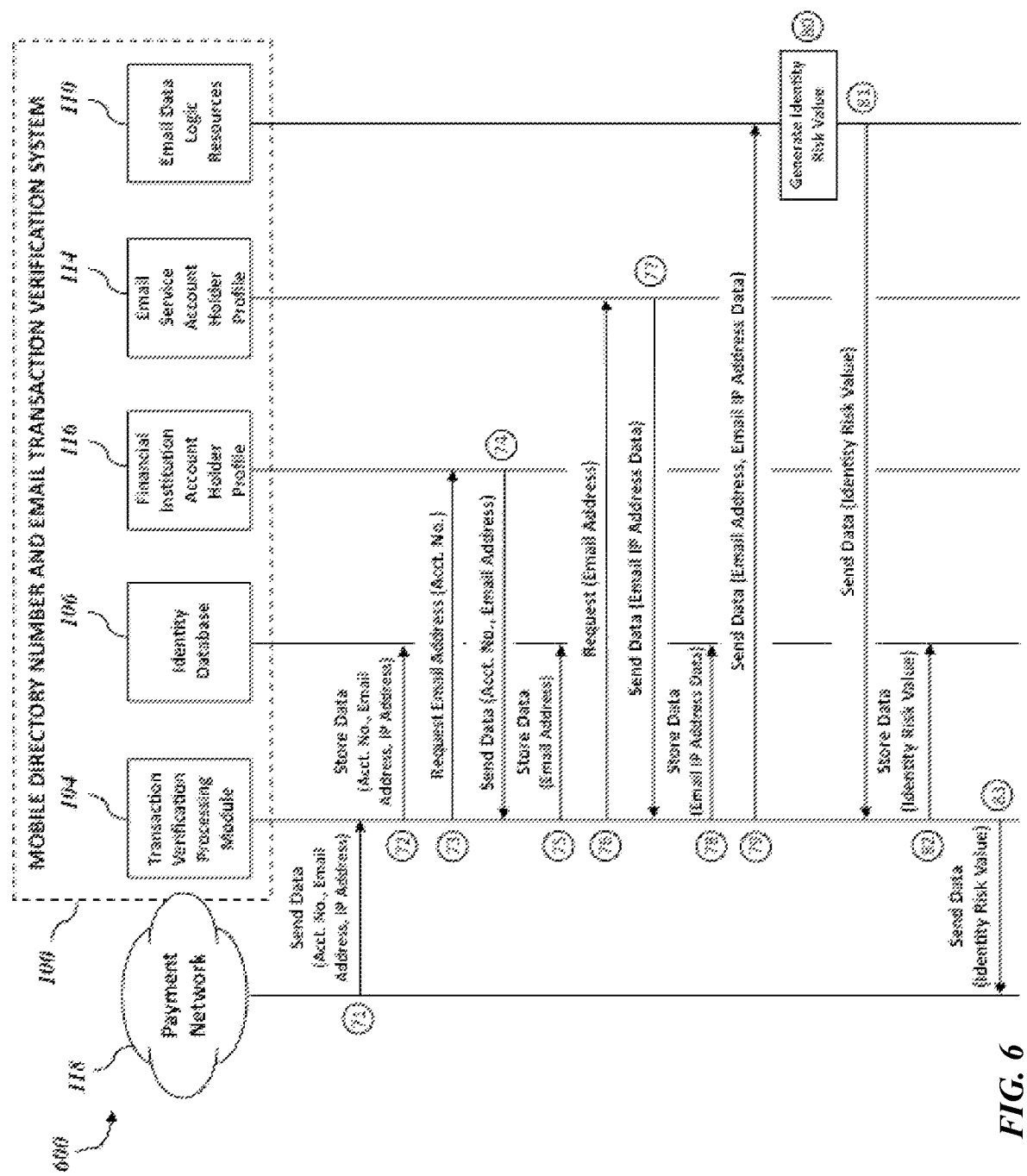
FIG. 6 depicts an exemplary flow diagram of the Mobile Directory Number and Email Transaction Verification System using Email Data Logic Resources.

FIG. 6 depicts an exemplary and detailed information and system flow diagram 600 representing the operation of the Mobile Directory Number and Email Transaction Verification System 100, in accordance with one embodiment of the present invention. In this exemplary information and system flow, an individual may initially invoke manually or automatically some financial transaction associated with some purchase of goods or services, or other financial operation using a payment instrument associated with a financial account number resulting in financial transaction information being sent to the payment network 118 and being obtained by the Mobile Directory Number and Email Transaction Verification System 100.

At a step 71, a financial transaction occurs and associated data is sent from the payment network 118 to the Transaction Verification and Processing Module 104 of the Mobile Directory Number and Email Transaction Verification System 100. The account number and optionally an Email Address 212 and/or an IP Address 214 may be sent autonomously or requested based on some other interaction between the Mobile Directory Number and Email Transaction Verification System 100 and the payment network 118 or other payment processing system.

At a step 72, the Transaction Verification and Processing Module 104 passes the account number, Email Address 212 and/or the IP Address Data 214 associated with the financial transaction to the Identity Database 106 for storage and subsequent use by the appropriate Email Data Logic Resource 110 associated with the particular financial transaction requiring an Identity Risk Value.

At a step 73, the Transaction Verification and Processing Module 104 makes a request to the financial institution 116 to obtain account data from the account holder profile, and particularly the Email Address 212 associated with the account holder corresponding to the provided account number.

At a step 74, the financial institution 116 passes the Email Address 212 to the Transaction Verification and Processing Module 104.

At a step 75, the Transaction Verification and Processing Module 104 passes the received Email Address 212 associated with the account holder to the Identity Database 106 for storage and subsequent use by the appropriate Email Data Logic Resource 110 associated with the particular financial transaction requiring an Identity Risk Value.

At a step 76, the Transaction Verification and Processing Module 104 passes the Email Address 212 to the email service provider 114 to request IP Address Data 214 from the email service provider 114 pertaining to the Email Address 212.

At a step 77, the email service provider 114 responds to the request for IP Address Data 214 pertaining to the Email Address 212 previously provided. The email service provider 114 sends IP Address Data 214 pertaining to the Email Address 212 to the Transaction Verification and Processing Module 104.

At a step 78, the Transaction Verification Processing Module 104 passes the received IP Address Data 214 to the Identity Database 106 for storage and subsequent use by the appropriate Email Data Logic Resource 110 associated with the particular financial transaction requiring an Identity Risk Value.

At a step 79, the appropriate data and parameters stored within the Identity Database 106 that are required by the Email Data Logic Resources 110 are passed either directly to the Email Data Logic Resources 110 or indirectly to the Email Data Logic Resources 110 via the Transaction Verification Processing Module 104 to be used in a calculation to generate an Identity Risk Value for the particular financial transaction requiring an Identity Risk Value.

At a step 80, an Identity Risk Value is generated based on the received and appropriate data and parameters.

At a step 81, the Identity Risk Value is passed either directly to the Identity Database 106 or indirectly to the Identity Database 106 via the Transaction Verification Processing Module 104.

At a step 82, if the Identity Risk Value is passed directly to the Transaction Verification Processing Module 104, the Transaction Verification Processing Module 104 passes the Identity Risk Value to the Identity Database 106 for storage and to be used for additional financial transactions requiring that Identity Risk Value.

At a step 83, the Transaction Verification Processing Module 104 passes the Identity Risk Value to the payment network 118 or other payment processing system for the corresponding financial transaction for which an Identity Risk Value was originally requested.

In the various embodiments, an identity risk value is developed. The identity risk value is a non-dimensional numerical value corresponding to a probability that a financial transaction of interest is fraudulent. The identity risk value falls within a predefined numerical range. For example, the identity risk value range may be from one to nine hundred ninety-nine (1-999) where a low identity risk value may indicate that the financial transaction of interest is likely not fraudulent, and a high identity risk value may indicate that the financial transaction of interest is likely to be fraudulent (or vice versa). Furthermore, the identity risk value may be a binary value that may simply indicate that a financial transaction of interest is more likely fraudulent than not (or vice versa). Any suitable identity risk value range may be used to define the relative probability of a determined identity risk value.

In some embodiments, the identity risk value is determined based upon a statistical correlation among one or more indicators of wireless device location, supplementary subscription data associated with a wireless device, IP address location and data that may be derived from other telephone directory numbers associated with a financial account holder as related to the financial transaction of interest. Exemplary indicators of wireless device location, supplementary subscription data associated with a wireless device, IP address location and data that may be derived from other telephone directory numbers associated with a financial account holder are described herein. Thus, the identity risk value provides the result of indicating a statistical relevant probability that the financial transaction of interest is likely, or is not likely, to be fraudulent.

Embodiments of the Mobile Directory Number and Email Transaction Verification System 100 generate the identity risk value using statistical correlation processes and methods. The wireless network and telecommunications data and information relative to the financial transaction of interest, are statistically analyzed such that the identity risk value is generated, thereby indicating a value that is indicative of the probability that the financial transaction of interest is fraudulent or valid. Any suitable statistical correlation process and/or method may be used to determine the identity risk value, and is not described herein in greater detail for brevity. However, a method such as assigning values between 0 and 999 to each obtained or derived data variable, providing a weighting factor to each data variable and averaging the values based on the weighting may be used, for example.

Figure 7:
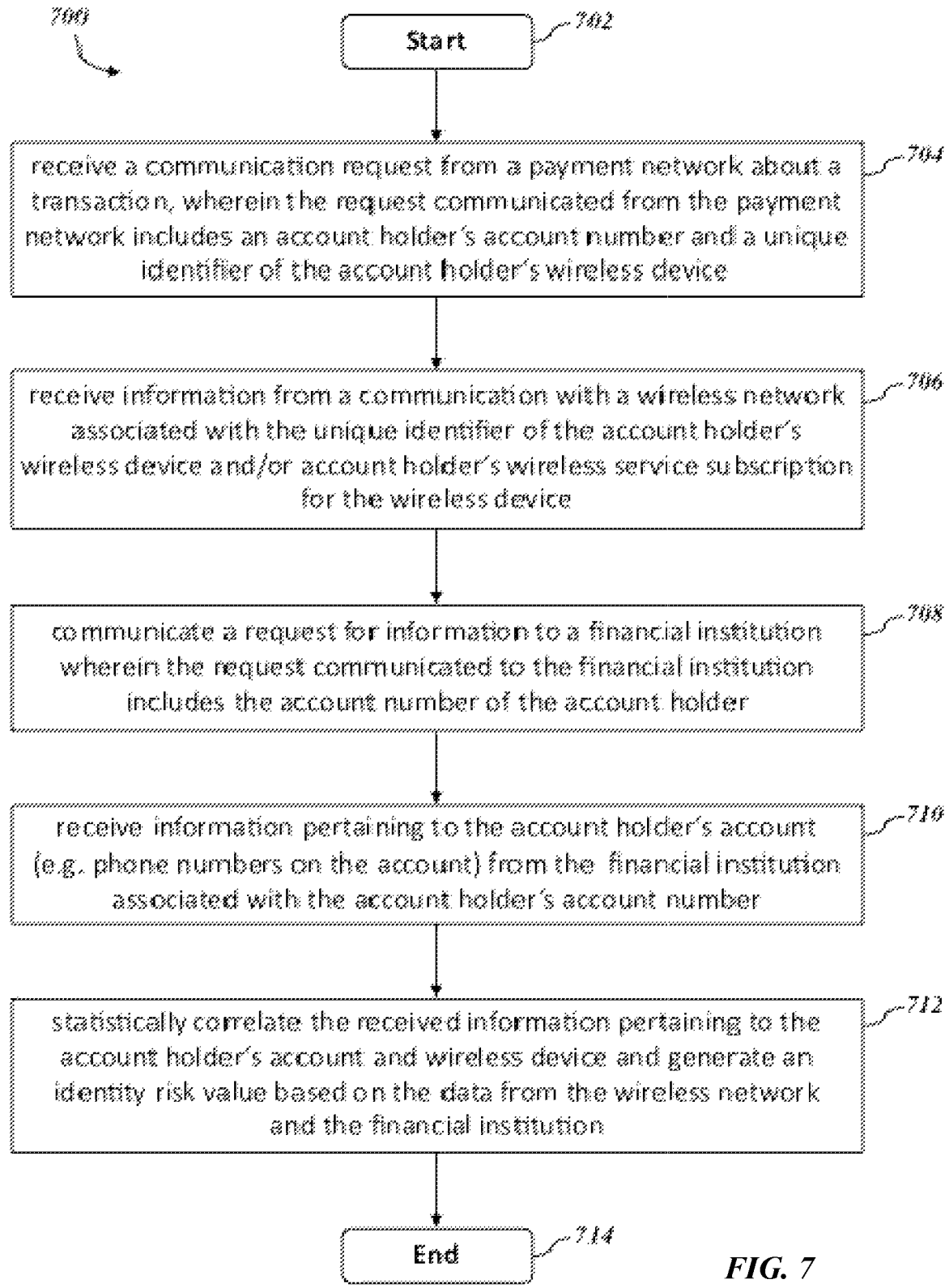
FIG. 7 depicts an exemplary information flow chart disclosing operation of the embodiments of the Mobile Directory Number and Email Transaction Verification System using Wireless Network Data Logic Resources.
Figure 8:
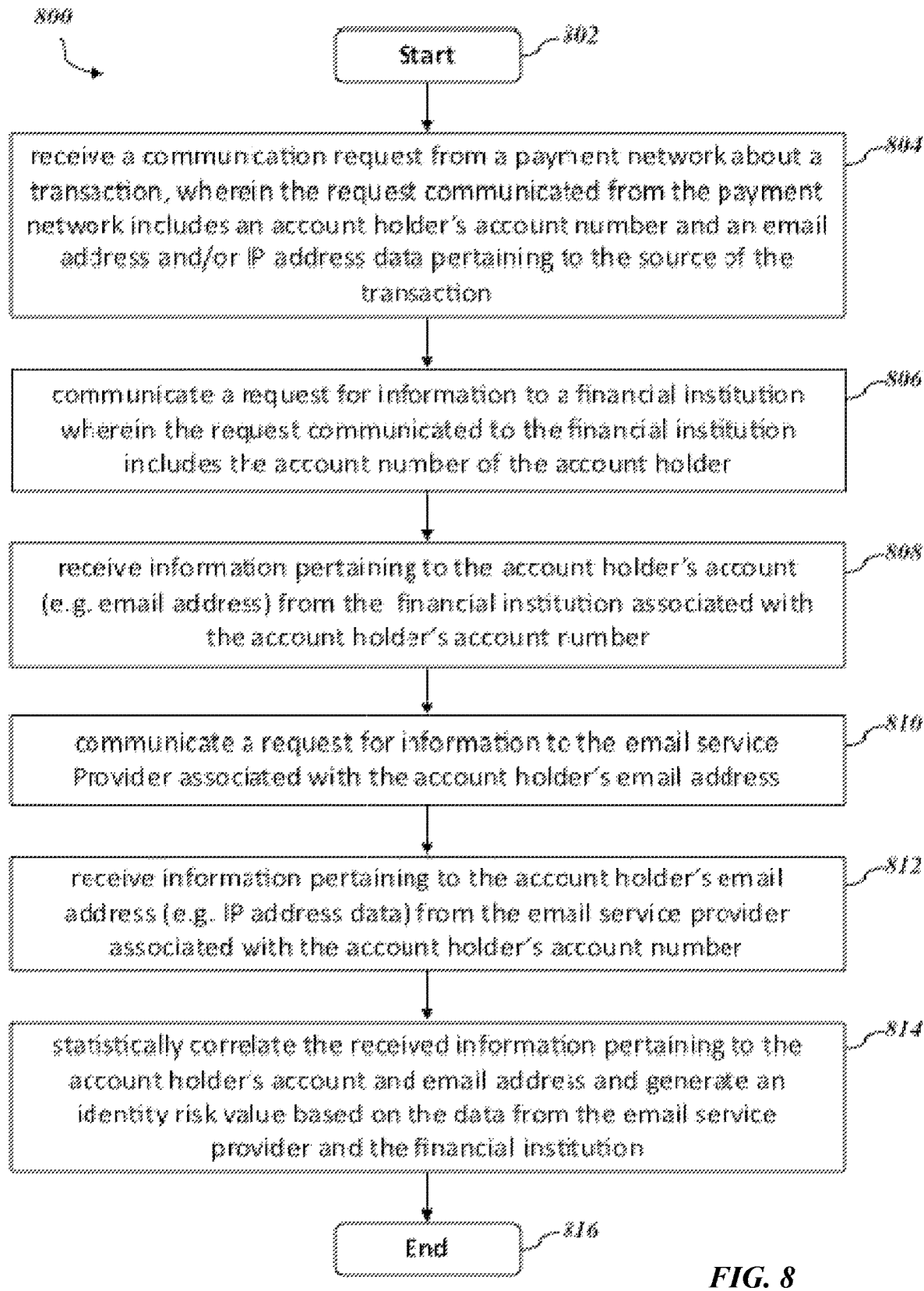
FIG. 8 depicts an exemplary information flow chart disclosing operation of the embodiments of the Mobile Directory Number and Email Transaction Verification System using Email Data Logic Resources.

FIGS. 7 and 8 depict flow charts of methods 700 and 800, respectively, disclosing algorithms describing operation of an exemplary embodiment of the Mobile Directory Number and Email Verification System 100. The flow methods 700 and 800 show the architecture, functionality, and operation of a possible implementation of the software for implementing the Mobile Directory Number and Email Verification System 100. In this regard, each block may represent a module, segment, or portion of code, which comprises one or more executable instructions for implementing the specified logical function(s). It should also be noted that in some alternative implementations, the functions noted in the blocks may occur out of the order noted in FIG. 7, may include additional functions, and/or may omit some functions. For example, two blocks shown in succession in FIG. 7 or in FIG. 8 may in fact be executed substantially concurrently, the blocks may sometimes be executed in the reverse order, or some of the blocks may not be executed in all instances, depending upon the functionality involved. All such modifications and variations are intended to be included herein within the scope of this disclosure.

The process of FIG. 7 starts at a block 702. At a block 704, a communication request is received from the payment network 118 that includes an account number used to identify an account related to a financial transaction and a unique identifier used to identify the account holder's wireless device 124. In various embodiments, the unique identifier representing an entity's wireless device 124 may be an MDN or other identifier that uniquely identifies the wireless device 124. Accordingly, the identity of the wireless device 124 of interest is therefore associated with a person of interest.

At a block 706, wireless network data is obtained from the home network of the account holder's wireless device 124 via the wireless network 102. The wireless network data represents information pertaining to the account holder's wireless device 124 and is determinable based upon the unique identifier of the account holder's wireless device 124. The request for information is made to the network using an appropriate communications protocol, communicated via the wireless network 102. The request is based upon the unique identifier of the account holder's wireless device 124. For example, various wireless device location and/or wireless device supplementary subscription data is stored within the wireless network 102 serving the wireless device 124. In response to the request for data, information pertaining to the wireless device 124 is provided to the Mobile Directory Number and Email Transaction Verification System 100.

At a block 708, a communication request is made to the financial institution 116 to request data associated with the financial account pertaining to an account holder identified by the account number provided in the request. The request for data is made to the financial institution 116 using an appropriate communications protocol. The request is based upon the account number associated with the account holder. For example, various account holder data is stored within the financial institution account holder profile 116 associated with the account number.

At a block 710, account holder data is obtained from (and/or in response to the communications request to) the account holder profile at the financial institution 116 associated with the provided account number. The data represents information pertaining to the account holder's account, and in particular, MDN(s) and other telephone directory numbers associated with the account. In response to the request for data, information pertaining to the account holder is provided to the Mobile Directory Number and Email Transaction Verification System 100.

At a block 712, an identity risk value is generated based on the wireless network data and the financial institution account holder data. The process of FIG. 7 ends at block 714.

The process of FIG. 8 starts at a block 802. At block 804, a communication request is received from the payment network 118 that includes an account number used to identify an account related to a financial transaction and an email address and/or IP address data associated with the financial transaction. Accordingly, the email address and/or IP address data of interest is therefore associated with a person of interest.

At a block 806, a communication request is made to the financial institution 116 to request data associated with the financial account pertaining to an account holder identified by an account number provided in the request. The request for data is made to the financial institution 116 using an appropriate communications protocol. The request is based upon the account number associated with the account holder. For example, various account holder data is stored within the account holder profile at the financial institution 116 associated with the account number.

At a block 808, account holder data is obtained from (and/or in response to the communications request to) the account holder profile at the financial institution 116 associated with the provided account number. The data represents information pertaining to the account holder's account, and in particular, email address(es) associated with the account. Preferably, the received account holder data is not available from other sources. In response to the request for data, information pertaining to the account holder is provided to the Mobile Directory Number and Email Transaction Verification System 100.

At a block 810, a communication request is made to the email service provider 114 to request data associated with the email address pertaining to the account holder that was received from the financial institution 116 and/or the payment network 118. The request for data is made to the email service provider 114 using an appropriate communications protocol. The request is based upon the email address associated with the email account. For example, various email account data is stored within the account holder profile at the email service provider 114 associated with the email address.

At a block 812, IP address data is obtained from (and/or in response to the communications request to) the email service provider account holder profile 114 associated with the provided email address. The data represents information pertaining to the account holder's email account, and in particular, IP addresses associated with access to the email account. Preferably, the received IP address data is not available from other sources. In response to the request for IP address data, information pertaining to the email account is provided to the Mobile Directory Number and Email Transaction Verification System 100.

At a block 814, an identity risk value is generated based on the email account data and the financial institution account holder data. The process of FIG. 8 ends at a block 816.

The generated identity risk value is indicative of whether or not a particular financial transaction of interest that is associated with a wireless device 124 and/or an email address is likely to be fraudulent or valid. Since the identity of the individual attempting to complete a financial transaction of interest can be associated with the wireless device 124 and/or a particular email address, then the identity risk value is indicative of the likelihood of fraud by the individual attempting to complete the financial transaction of interest.

For example, an individual associated with the wireless device 124 and/or a particular email address may be attempting to conduct a financial transaction, such as a purchase using a credit card or debit card. The generated identity risk value would give an indication of whether or not the financial transaction is likely to be valid when the obtained wireless device location data, supplementary subscription data associated with the wireless device, IP address location data and/or other data that may be derived from other telephone directory numbers associated with a financial account holder tend to indicate that the individual attempting to conduct the financial transaction of interest is the same individual that is associated with the wireless device 124 and/or an email address.

In an exemplary embodiment, the multiplicity of location data obtained by the Mobile Directory Number and Email Transaction Verification System 100 pertaining to an MDN (e.g. wireless device 124 location data), other telephone directory numbers (e.g. CC and NDC location data) and IP address data (e.g. IP geographical location data) of a financial transaction of interest may be used, along with historical location data to determine location patterns pertaining to an individual. By analyzing these location patterns, and potentially performing a statistical correlation among these location data, the Mobile Directory Number and Email Transaction Verification System 100 may be able to determine irregular or anomalous locations associated with an individual corresponding to a financial transaction of interest.

As a non-limiting example, for a particular MDN associated with a financial transaction, a particular email address associated with the financial transaction or both, obtained location data may be associated with geographic areas around City A and City B. Furthermore, City A may be separated from City B by some large distance, for example, 1000 miles. Obtained wireless device 124 location data may be near City A. Historical wireless device 124 location data may be near City B. Country code and national destination code information of a second obtained telephone directory number may be associated with City B, implying that an individual is associated with a telephone number at City B. Obtained IP address location data pertaining to an obtained IP address may be associated with City A, implying that email account access has occurred near City A. When a financial transaction of interest occurs and is sent form the payment network 118 to the Mobile Directory Number and Email Transaction Verification System 100, the Mobile Directory Number and Email Transaction Verification System 100 may determine that email account access relating to an individual associated with the financial transaction has occurred near City A within the past one hour of the financial transaction occurring. Further, the Mobile Directory Number and Email Transaction Verification System 100 may determine that the wireless device 124 identified with the individual associated with the financial transaction was near City B within the past one hour of the financial transaction occurring. Thus, in this example, the Mobile Directory Number and Email Transaction Verification System 100 uses a statistical correlation method and/or process to conclude that there is a reasonable probability that the individual is now near City B. Since it is statistically reasonable that it could take many hours to fly from City A to City B, the identity risk value would indicate a reasonable likelihood that the financial transaction of interest is invalid or fraudulent.

In some embodiments, the status of an MDN representing the wireless device 124 or other telephone directory numbers may be used to determine the identity risk value. It is appreciated that in some situations, a fraudulent financial transaction may occur in the absence of the wireless device 124 (which is tantamount to the wireless device 124 being inactive, or "off"). If the state of the wireless device 124 is active (the wireless device 124 is "on"), the Mobile Directory Number and Email Transaction Verification System 100 may then statistically conclude that there is a reasonable probability that the financial transaction of interest is likely to be valid (since the wireless device 124 is in an active state). On the other hand, the Mobile Directory Number and Email Transaction Verification System 100 may statistically conclude that there is a reasonable probability that the financial transaction of interest is likely to be fraudulent (if the state of the wireless device 124 is inactive). The state of the wireless device 124 may be provided by the wireless network 102 in response to a request for information generated by the Mobile Directory Number and Email Transaction Verification System 100. Furthermore, it is appreciated that in some situations, a fraudulent financial transaction may occur when other telephone directory numbers associated with the financial transaction of interest are obtained by the Mobile Directory Number and Email Transaction Verification System 100. The Mobile Directory Number and Email Transaction Verification System 100 may determine that one or more of these numbers are not in use and associated with the individual corresponding to the financial transaction of interest. If one or more of the telephone directory numbers are in use, there may be a name associated with the subscription that may or may not be similar to the name associated with the account holder. If any of the obtained telephone directory numbers are not in use, or the name associated with any of the obtained telephone directory numbers that are in use for the subscription of the these numbers, is not similar to the name when compared to the name associated with the MDN subscription, the names on other telephone directory numbers or the name on the actual financial account associated with the financial transaction of interest, the Mobile Directory Number and Email Transaction Verification System 100 may then statistically conclude that there is a reasonable probability that the financial transaction of interest is likely to be invalid. On the other hand, the Mobile Directory Number and Email Transaction Verification System 100 may statistically conclude, using the data discussed above and optionally other data and parameters obtained and associated with the financial transaction of interest, that there is a reasonable probability that the financial transaction of interest is likely to be valid (if the state of all of the telephone directory numbers is "assigned" and/or the name associated with all of the telephone directory numbers is similar to the name when compared to the name associated with the MDN subscription or the name of the financial account holder).

In some embodiments, the format of the email address may be used to determine the identity risk value. If the "local-part" portion of the obtained email address of an individual associated with the financial transaction has a string of characters that is similar to the name of the account holder on the financial account for a financial transaction of interest and/or the name on subscriptions associated with the MDN and other telephone directory numbers, the Mobile Directory Number and Email Transaction Verification System 100 may statistically conclude, using the data discussed above, and optionally other data and parameters obtained and associated with the financial transaction of interest, that there is a reasonable probability that the financial transaction of interest is likely to be valid. For example, the email address may have the value "jsmith@gmail.com" where the name on the financial account is "John Smith" and the names on the subscriptions for the MDN and other telephone directory numbers are "J. Smith," "John Smith" or the like. Conversely, for example, the email address may have the value "x@xyz.com" where the name on the financial account is "John Smith" and the names on the subscriptions for the MDN and other telephone directory numbers are "J.

Smith," "John Smith" or the like. In this case, the Mobile Directory Number and Email Transaction Verification System 100 may statistically conclude, using the data discussed above, and optionally other data and parameters obtained and associated with the financial transaction of interest, that there is a reasonable probability that the financial transaction of interest is likely to be invalid as the email address appears to be of an anonymous value, which may an indication that the financial transaction of interest is fraudulent.

Similarly, if the "domain" portion of the obtained email address of an individual associated with a financial transaction has a public and potentially anonymous value, such as "gmail," "aol," "yahoo," or the like, the Mobile Directory Number and Email Transaction Verification System 100 may statistically conclude, using the data discussed above, and optionally other data and parameters obtained and associated with the financial transaction of interest, that the financial transaction of interest is more likely to be invalid as these domain name values, that may be anonymous, are more associated with fraudulent financial transactions in general. Conversely, if the "domain" portion of the obtained email address of an individual associated with the financial transaction has a well-known corporate name associated with more private email addresses, such as "ibm," "boeing," "apple," or the like, the Mobile Directory Number and Email Transaction Verification System 100 may statistically conclude, using the data discussed above, and optionally other data and parameters obtained and associated with the financial transaction of interest, that the financial transaction of interest is more likely to be valid as these domain name values are more associated with legitimate financial transactions in general.

In some embodiments, the time of access to an email account associated with an email address related to a financial transaction of interest may be used to determine the identity risk value. The Mobile Directory Number and Email Transaction Verification System 100 may use the obtained email address for the financial transaction of interest and analyze and process the email address along with additional obtained IP address data. Based on this analysis, a probabilistic determination of fraud can be made that the IP address data associated with the financial transaction is fraudulent or not. An example of this processing might be that the email address provided was accessed from a computer in Bellevue, Wash., and one hour later a CNP transaction for the owner of the email account was made in Miami, Fla. This could indicate the possibility of a fraudulent financial transaction. Another example might be that the IP address data associated with the transaction emanated from an IP address that was never accessed for the individual's email account. This could also be an indication that the transaction may be fraudulent.

In some embodiments, the wireless network and type of wireless subscription may be used to determine the identity risk value. Financial fraud and fraudulent activities tend to be associated with pre-paid wireless accounts more often than with post-paid wireless accounts. The reason for this is that pre-paid wireless subscribers tend to be more transient and are often times not required to provide any personal information to the wireless network to obtain a subscription. Some wireless networks provide pre-paid wireless accounts only to subscribers, while some wireless networks provide both pre-paid and post-paid wireless accounts. If the MDN associated with a financial transaction of interest is associated with a pre-paid account, the Mobile Directory Number and Email Transaction Verification System 100 may statistically conclude and, using the data discussed above, and optionally other data and parameters obtained and associated with the financial transaction of interest, that the financial transaction of interest is more likely to be invalid. It is appreciated that service provided from a well known subscription service provider may tend to indicate that the financial transaction of interest is valid. On the other hand, if the subscription service provider is a small organization, and/or if the subscription service provider is based in a country with little to no regulatory oversight or legal enforcement, it is appreciated that such a subscription service provider may tend to indicate that the financial transaction of interest is likely to be fraudulent. Accordingly, embodiments of the Mobile Directory Number and Email Transaction Verification System 100 use the identity of the particular wireless network operator in determining the identity risk value.

In some embodiments, the age of the MDN subscription or other obtained telephone directory number subscriptions associated with a financial account corresponding to a financial transaction of interest may be used to determine the identity risk value. Mobile directory numbers (MDNs) and other telephone directory numbers that have been associated with a subscription for the same individual for a very short period of time, such as one month at the time the financial transaction of interest was performed, for example, may be associated with transience of the individual where this transient status may be more indicative of a higher risk of financial fraud. If the MDN and/or other telephone directory numbers relating to a financial transaction of interest have been associated with a subscription for a short period of time, the Mobile Directory Number and Email Transaction Verification System 100 may statistically conclude, using the data above and optionally other data and parameters obtained and associated with the financial transaction of interest, that the financial transaction of interest is more likely to be invalid. Conversely, if the MDN and/or other telephone directory numbers relating to the financial transaction of interest have been associated with a subscription for a long period of time, for example, one year or longer, the Mobile Directory Number and Email Transaction Verification System 100 may statistically conclude, using that information and optionally other data and parameters obtained and associated with the financial transaction of interest, that the financial transaction of interest is more likely to be valid.

Recent regulatory provisions allow an individual to retain their current mobile directory number if the individual changes their wireless network subscription service provider. In some embodiments, the service history of the entity's current mobile directory number, and potentially other obtained telephone directory numbers, is obtained from the wireless network. It is appreciated that a criminal engaging in fraudulent activities may frequently change their subscription service provider in an effort to avoid detection by legal enforcement agencies. In contrast, an honest citizen is more likely to retain their service provider for a long period of time. Accordingly, it is appreciated that a service, or porting, history demonstrating frequent and reoccurring changes to different subscription service providers may be associated with criminal activity and that the financial transaction of interest is likely to be fraudulent. On the other hand, it is appreciated that a history demonstrating a long duration of service from a single subscription service provider may tend to indicate that the financial transaction of interest is valid. Accordingly, embodiments of the Mobile Directory Number and Email Transaction Verification System 100 consider the service history of the wireless device 124, and other telephone directory numbers, in determining the identity risk value.

In some embodiments, the subscribed features such as call-forwarding, for example, associated with the MDN wireless network subscription or other obtained telephone directory number subscriptions, relating to a financial account corresponding to a financial transaction of interest may be used to determine the identity risk value. It is appreciated that a criminal engaging in fraudulent financial transactions is more likely to subscribe to a relatively inexpensive subscription service and that an honest citizen is more likely to subscribe to a premium subscription service. Accordingly, the Mobile Directory Number and Email Transaction Verification System 100 may statistically conclude that there is a reasonable probability that the financial transaction of interest is likely to be valid when the wireless device 124 is receiving a premium subscription service. On the other hand, the Mobile Directory Number and Email Transaction Verification System 100 may statistically conclude that there is a reasonable probability that the financial transaction of interest is likely to be fraudulent if the wireless device 124 has been receiving an inexpensive subscription service.

In an example embodiment, the above-described wireless device location indicia, wireless device supplementary subscription indicia, telephone directory number indicia, email address indicia and IP address indicia obtained by the Mobile Directory Number and Email Transaction Verification System 100 in response to a request for information from embodiments of the Mobile Directory Number and Email Transaction Verification System 100 are used to determine the identity risk value using a suitable statistical correlation process and/or method. Embodiments may determine the identity risk value using one or more of the above-described indicia. Weighting may be used to adjust the relevance of particular indicia when the identity risk value is determined. Embodiments may selectively pick available indicia for consideration when the identity risk value is determined.

Further, other available supplementary information may also be considered when the identity risk value is determined. For example, a remote source may provide a credit history, billing history or the like that is considered when the identity risk value is determined.

Figure 9:
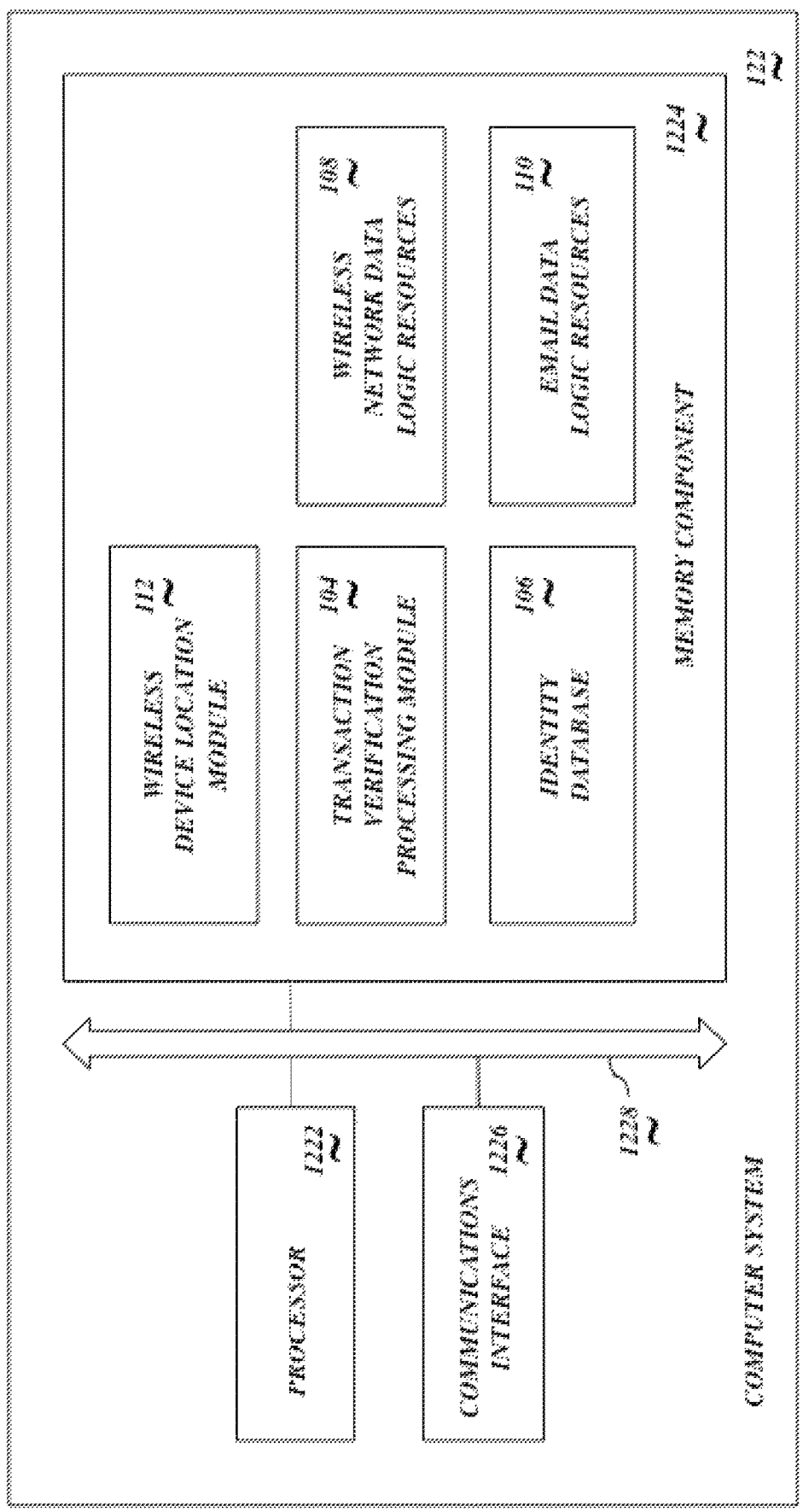
FIG. 9 depicts computer system components of an exemplary Mobile Directory Number and Email Transaction Verification System including a computer processor, communications interface and memory components where the exemplary functional entities and modules of the Mobile Directory Number and Email Transaction Verification System reside in an example embodiment.

FIG. 9 depicts an exemplary computer system 122 of an embodiment of the Mobile Directory Number and Email Transaction Verification System 100. The computer system 122 includes at least one processor 1222, at least one memory component 1224 in signal communication with the processor 1222, and at least one communications interface 1226 in signal communication with the processor 1222. The processor 1222, the memory component 1224, and the communications interface 1226 are communicatively coupled to a communication bus 1228, thereby providing connectivity between the above-described components. In alternative embodiments of the Mobile Directory Number and Email Transaction Verification System 100, the above-described components may be communicatively coupled to each other in a different manner. For example, one or more of the above-described components may be directly coupled to the processor 1222, or may be coupled to the processor 1222 via intermediary components (not shown). Further, additional components (not shown) may be included in alternative embodiments of the Mobile Directory Number and Email Transaction Verification System 100.

The memory component 1224 may be any suitable memory device or system. Depending upon the embodiment, the memory component 1224 may be a dedicated memory system, may be part of another component or system, and/or may be a distributed memory system. The memory component 1224 may also include other logic, modules and/or databases not illustrated or described herein.

In the context of this disclosure, the memory component 1224 is a computer-readable medium that is an electronic, magnetic, optical, or other another physical device or means that contains or stores a computer and/or processor program. The computer-readable medium can be, for example, but is not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette (magnetic, compact flash card, secure digital, or the like), a random access memory (RAM), a read-only memory (ROM), an erasable programmable read-only memory (EPROM, EEPROM, or Flash memory), an optical fiber, and a portable compact disc read-only memory (CDROM). Note that the computer-readable medium, could even be paper or another suitable medium upon which the program associated with logic is printed, as the program can be electronically captured, via for instance optical scanning of the paper or other medium, then compiled, interpreted, or otherwise processed in a suitable manner, if necessary, and then stored in a device such as another memory component in signal communication with the processor 1222.

The communications interface 1226 is illustrated and described herein as a single component that is configured to communicate with the wireless network 102. Also, the communications interface 1226 is illustrated and described as being configured to communicate with the financial institution 116. Further, the communications interface 1226 is illustrated and described as being configured to communicate with the email service provider 114. Additionally, the communications interface 1226 is illustrated and described as being configured to communicate with the payment network 118 that provides a request for information pertaining to the likelihood that a financial transaction of interest is valid.

It is appreciated that the communications interface 1226 may be comprised of a plurality of communication devices that act in cooperation so that embodiments of the Mobile Directory Number and Email Transaction Verification System 100 are able to access the various entities described herein. Further, the wireless network 102 may be a different system than a wireless network associated with network supplemental information system 126. Accordingly, the various communication devices of the communications interface 1226 may be different from each other so as to support communications over a variety of different networks that may be using different communication formats.

Embodiments of the Mobile Directory Number and Email Transaction Verification System 100 are configured to concurrently process a plurality of requests to verify that a plurality of different financial transactions of interest are valid. The plurality of requests may originate from the same payment network 118. That is, it is likely that a large payment network 118, such as a bank or credit card company, will be concurrently conducting many different financial transaction of interest with different customers. Further, embodiments of the Mobile Directory Number and Email Transaction Verification System 100 may be configured to concurrently process the plurality of communications requests and responses for information from many different systems. That is, embodiments are configured to concurrently request and respond from/to different systems, such as multiple payment networks 118, multiple wireless networks 102, multiple financial institutions 116 and multiple email service providers 114.

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

The invention claimed is:

1. A method comprising:
receiving, by a transaction verification processing module and from a computer, an account number associated with a user and a first wireless device ID associated with the computer;
storing, by the transaction verification processing module, the first wireless device ID in an identity database;
sending, by the transaction verification processing module and over a first network, a query including the account number from the transaction verification processing module to an institution;
receiving, by the transaction verification processing module and over the first network, a second wireless device ID at the transaction verification processing module from the institution in response to the query;
storing, by the transaction verification processing module, the second wireless device ID in the identity database;
passing, by the transaction verification processing module, the second wireless device ID to a wireless device location module, which communicates with a wireless network to obtain location data pertaining to the second wireless device ID;
receiving, by the transaction verification processing module, the location data pertaining to the second wireless device ID from the wireless device location module;
storing, by the transaction verification processing module, the location data in the identity database;
receiving, by the transaction verification processing module, a first e-mail address and a first IP address from the computer at the transaction verification processing module;
storing, by the transaction verification processing module, the first e-mail address in the identity database;
passing, by the transaction verification processing module, the first e-mail address and the account number to the institution;
receiving, by the transaction verification processing module and over the first network, a second e-mail address from the institution;
storing, by the transaction verification processing module, the second e-mail address in the identity database;
passing, by the transaction verification processing module, the second e-mail address to an e-mail service provider;
receiving, by the transaction verification processing module, a second IP address associated with the second e-mail address;
storing, by the transaction verification processing module, the second IP address in the identity database;
assigning a first weighting factor of a set of weighting factors based on a number of common parameters between the first wireless device ID and the second wireless device ID, each of the set of weighting factors indicative of a relative likelihood of a transaction being fraudulent;
assigning a second weighting factor of the set of weighting factors based on a proximity between the first wireless device and the second wireless device provided in the location data;
assigning a third weighting factor of the set of weighting factors based on a number of common parameters between the first IP address and the second IP address;
assigning a fourth weighting factor of the set of weighting factors based on a number of common parameters between the first e-mail address and the second e-mail address, wherein the identity risk value is generated using a combination of each of the set of weighting factors; and
generating, by the transaction verification processing module, an identity risk value based on the set of weighting factors;
sending, by the transaction verification processing module, the identity risk value to the computer.

2. The method according to claim 1, further comprising:
receiving at least one additional wireless device ID associated with the account number from the institution, wherein generating the identity risk value is also based on the at least one additional wireless device ID.

3. The method according to claim 2, further comprising presenting an authorization indicator to a computerized device based on whether the transaction was authorized.

4. The method according to claim 1, wherein the transaction is authorized or declined based on the identity risk value.

5. The method according to claim 1, wherein the identity risk value is determined based on a plurality of data types, the plurality of data types including the comparison between the first wireless device ID and the second wireless device ID, and wherein each data type of the plurality of data types is associated with a weighting factor.

6. The method according to claim 5, wherein the weighting factor is dynamic.

7. The method according to claim 1, wherein the identity risk value corresponds to a probability that the transaction is fraudulent.

8. The method according to claim 1, further comprising:
sending, over a second network, a first request including the first wireless device ID to the wireless device, the wireless device storing first wireless device data associated with the first wireless device ID;
receiving, over the second network, the first wireless device data from the wireless device;
sending, over the second network, a second request including the second wireless device ID to the wireless device, the wireless device storing second wireless device data associated with the second wireless device ID; and
receiving, over the second network, the second wireless device data from the wireless device, wherein the identity risk value is further generated based on a comparison between the first wireless device data and the second wireless device data.

9. The method according to claim 8, wherein the first wireless device data and the second wireless device data include wireless network supplementary subscription data.

10. The method according to claim 8, wherein the first wireless device data includes first wireless device location data and the second wireless device data includes second wireless device location data.

11. The method according to claim 10, wherein the identity risk value is determined based on a plurality of data types, the plurality of data types including the comparison between the first wireless device ID and the second wireless device ID and the comparison between the first wireless device data and the second wireless device data, wherein each data type of the plurality of data types is associated with a weighting factor, and wherein the weighting factor is based upon at least one of a distance variance and a time variance among the first wireless device location data and the second wireless device location data.

12. A computerized verification system comprising:
one or more processors, and one or more non-transitory computer readable media coupled to the one or more processors, the one or more non-transitory computer readable media comprising code, executable by the processor, to perform the steps of:
receiving, by a transaction verification processing module and from a computer, an account number associated with a user and a first wireless device ID associated with the computer;
storing the first wireless device ID in an identity database;
sending, over a first network, a query including the account number from the transaction verification processing module to an institution;
receiving, over the first network, a second wireless device ID at the transaction verification processing module from the institution in response to the query;
storing the second wireless device ID in the identity database;
passing the second wireless device ID to a wireless device location module, which communicates with a wireless network to obtain location data pertaining to the second wireless device ID;
receiving the location data pertaining to the second wireless device ID from the wireless device location module;
storing the location data in the identity database;
receiving a first e-mail address and a first IP address from the computer at the transaction verification processing module;
storing the first e-mail address in the identity database;
passing the first e-mail address and the account number to the institution;
receiving, over the first network, a second e-mail address at the transaction verification processing module from the institution;
storing the second e-mail address in the identity database;
passing the second e-mail address to an e-mail service provider;
receiving a second IP address associated with the second e-mail address;
storing the second IP address in the identity database;
assigning a first weighting factor of a set of weighting factors based on a number of common parameters between the first wireless device ID and the second wireless device ID, each of the set of weighting factors indicative of a relative likelihood of a transaction being fraudulent;
assigning a second weighting factor of the set of weighting factors based on a proximity between the first wireless device and the second wireless device provided in the location data;
assigning a third weighting factor of the set of weighting factors based on a number of common parameters between the first IP address and the second IP address;
assigning a fourth weighting factor of the set of weighting factors based on a number of common parameters between the first e-mail address and the second e-mail address, wherein the identity risk value is generated using a combination of each of the set of weighting factors;
generating an identity risk value based on the set of weighting factors; and
sending the identity risk value to the computer.

13. The computerized verification system of claim 12, wherein the steps further comprise: receiving at least one additional wireless device ID associated with the account number from the institution, wherein determining the identity risk value is also based on the at least one additional wireless device ID.

14. The computerized verification system of claim 12, wherein the method further comprises: presenting an authorization indicator to a computerized device based on whether the transaction was authorized.

* * * * *